(12) United States Patent
Utakouji

(10) Patent No.: US 7,260,404 B2
(45) Date of Patent: Aug. 21, 2007

(54) BASE STATION CONTROL APPARATUS AND FREQUENCY ALLOCATION METHOD FOR SAME

(75) Inventor: Akira Utakouji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 130 days.

(21) Appl. No.: 10/925,617

(22) Filed: Aug. 25, 2004

(65) Prior Publication Data

US 2005/0181802 A1    Aug. 18, 2005

(30) Foreign Application Priority Data

Feb. 13, 2004    (JP) .............................. 2004-036184

(51) Int. Cl.
  *H04M 1/00*    (2006.01)
  *H04B 7/00*    (2006.01)
  *H04B 7/216*   (2006.01)
  *H04Q 7/20*    (2006.01)
  *H04Q 7/00*    (2006.01)

(52) U.S. Cl. ................... 455/452.1; 455/447; 455/450; 455/451; 455/453; 455/509; 370/320; 370/329

(58) Field of Classification Search ........ 455/450–453, 455/447, 509; 370/320, 329
See application file for complete search history.

(56) References Cited

U.S. PATENT DOCUMENTS

| | | | |
|---|---|---|---|
| 6,181,941 B1* | 1/2001 | McCarthy ................... | 455/436 |
| 6,628,637 B1* | 9/2003 | Li et al. ...................... | 370/342 |
| 6,956,863 B2* | 10/2005 | Park et al. ................... | 370/431 |
| 2001/0004599 A1* | 6/2001 | Dokko ........................ | 455/452 |
| 2001/0036166 A1* | 11/2001 | Park et al. .................. | 370/335 |
| 2003/0064730 A1* | 4/2003 | Chen et al. ................. | 455/453 |
| 2003/0129988 A1* | 7/2003 | Lee et al. ................... | 455/450 |
| 2004/0203688 A1* | 10/2004 | Backes et al. .............. | 455/418 |

FOREIGN PATENT DOCUMENTS

| | | |
|---|---|---|
| JP | 5-308319 | 11/1993 |
| JP | 2003-125440 | 4/2003 |
| JP | 2003-179966 | 6/2003 |

* cited by examiner

*Primary Examiner*—William Trost
*Assistant Examiner*—Ariel Balaoing
(74) *Attorney, Agent, or Firm*—Katten Muchin Rosenman LLP

(57) ABSTRACT

In a code division multiplexing communication system capable of utilizing a plurality of frequencies, a monitoring section 1 of a base station control apparatus monitors, for each frequency, the number of calls for each call type to which a frequency is allocated; an allocation section 2 allocates, when a new call occurs, a frequency among all the frequencies to the call such that unevenness in the distribution for each call types among frequencies does not occur; and a notification section 3 notifies a terminal through a base station 4, when the frequency differing from an awaiting frequency of the terminal is allocated to the call, of the frequency as a new awaiting frequency.

6 Claims, 18 Drawing Sheets

| TBL — CALL ALLOCATION CONDITIONS | | | |
|---|---|---|---|
| FREQUENCY | HIGH-SPEED CALL | INTERMEDIATE-SPEED CALL | LOW-SPEED CALL |
| FREQUENCY RF1 | $c_n - RF_1$ | $b_n - RF_1$ | $a_n - RF_1$ |
| FREQUENCY RF2 | $c_n - RF_2$ | $b_n - RF_2$ | $a_n - RF_2$ |
| ... | ... | ... | ... |
| FREQUENCY RFN | $c_n - RF_N$ | $b_n - RF_N$ | $a_n - RF_N$ |
| AVAILABLE RESOURCES : $R_{TH}$ | | | |
| RESOURCES CURRENTLY IN USE : $R_u$ | | | |
| REMAINING RESOURCES : $R_e$ | | | |

| CALL ALLOCATION CONDITIONS ||||
|---|---|---|---|
| FREQUENCY | HIGH-SPEED CALL | INTERMEDIATE-SPEED CALL | LOW-SPEED CALL |
| FREQUENCY RF1 | $c_n - RF_1$ | $b_n - RF_1$ | $a_n - RF_1$ |
| FREQUENCY RF2 | $c_n - RF_2$ | $b_n - RF_2$ | $a_n - RF_2$ |
| ... | ... | ... | ... |
| FREQUENCY RFN | $c_n - RF_N$ | $b_n - RF_N$ | $a_n - RF_N$ |
| AVAILABLE RESOURCES : $R_{TH}$ ||||
| RESOURCES CURRENTLY IN USE : $R_u$ ||||
| REMAINING RESOURCES : $R_e$ ||||

TBL

BASE STATION CONTROL APPARATUS AND FREQUENCY ALLOCATION METHOD FOR SAME

BACKGROUND OF THE INVENTION

This invention relates to a base station control apparatus and a frequency allocation method for such an apparatus, and in particular relates to a base station control apparatus and frequency allocation method in a wireless multiplex transmission system which multiplexes a plurality of signals at the same frequency, further multiplexes a plurality of frequencies, and transmits the resulting signal.

In a code division multiplex communication system capable of using a plurality of frequencies, when an originating call is generated by a terminal, or when a terminating call is generated by the core network, the base station control apparatus compares the required power or required bandwidth (hereafter called "required resources") for the call, and the remaining usable resources at a specific frequency predetermined in advance; if the required resources are smaller, the call is accepted, and if larger, a different frequency is allocated to the call. However, when both calls requiring large resources (high-speed calls) and calls requiring small resources (low-speed calls) coexist, conventional frequency allocation methods have no policy for frequency allocation and cannot optimally allocate frequencies, so that there is the problem that the total number of calls which can be accepted is reduced. Below, this problem is explained.

In a cellular system which provide only services for low-bitrate communications such as voice transmissions, the power required for a single call is not very great, and numerous channels can be accommodated simultaneously; hence as a result of statistical multiplexing of fluctuations in required power due to the speed of motion of individual mobile stations, fluctuations in interference power with other cells in uplink channels, fluctuations due to multipath interference in downlink channels, and other factors, the fluctuation width of reception interference power in uplink of base stations, and the fluctuation width of the total base station transmission power in downlink of base stations, are compressed (reduced).

On the other hand, in the cellular systems of recent years which provide only high-bitrate communication services, much power is required for a single call, and the number of channels which can be accommodated simultaneously is reduced, so that the effect of statistical multiplexing on fluctuations in required power due to the speed of motion of individual mobile stations, fluctuations in interference power with other cells in uplink channels, and fluctuations due to multipath interference in downlink channels, is decreased. As a consequence there are large fluctuations in the reception interference power in uplink of base stations and in the total base station transmission power in downlink of base stations.

Hence in order to ensure communication quality when providing high-speed or high-bitrate communications, large fluctuations in the reception interference power and total base station transmission power must be taken into account, by setting thresholds with an adequate margin for call connection control. FIG. 19 explains a method of traffic control for a mixture of low-speed and high-speed communications; as indicated in (A), the frequencies are RF1 to RFN, and the resource thresholds for allocation of each frequency is RTH. If the total allocated resources do not exceed the threshold, allocation to calls is possible. A terminal uses one of the frequencies from RF1 to RFN as a control channel for communication with the base station; and a frequency is set for use by the network (base station control apparatus) at the time of purchase of the terminal. This frequency is here defined as the awaiting frequency.

As shown in (B), when a high-speed call occurs for a awaiting frequency of RF1, the communication channel at frequency RF1 is already full. Hence RF1 cannot be allocated to high-speed calls, and so the next frequency RF2 is changed to the new awaiting frequency, and the communication channel at this frequency RF2 is allocated. As a result, the frequency RF2 is allocated to three high-speed calls.

In the above traffic control method, which takes the base station reception interference power and total base station transmission power as threshold values for call connections, when the types of service provided at the same frequency tend to be low-speed or low-bitrate services (low-speed calls), the effect of statistical multiplexing results in a substantial concentration effect, so that fluctuations in the total transmission power for the base station are reduced. Conversely, when high-speed or high-bitrate services (high-speed calls) tend to be more common, the effect of statistical multiplexing is not obtained and there is no concentration effect, so that fluctuations in the total transmission power for the base station tend to be large. The above concentration effect comprises both the concentration effect described in general traffic theory, and the concentration effect in the sense of statistical multiplexing of fluctuations in wireless transmission paths.

FIG. 20 explains increases in the total base station transmission power in a multiple-connection traffic model; the horizontal axis indicates the number of high-speed channels contained in one frequency, and the vertical axis is the minimum power ratio satisfying the required degradation ratio, for degradation ratios of 0.1%, 1.0%, and 10%. As the number of high-speed channels increases, the minimum power ratio increases; in particular, when the number of high-speed channels is four or greater, the minimum power ratio is seen to rise rapidly.

Hence when both low-speed and high-speed calls exist, if high-speed calls are concentrated at a particular frequency the required power at that frequency increases, and consequently the number of calls which can be transmitted at a fixed power is reduced. Because of this, when using a method of allocation to the next frequency when one frequency becomes full, as in FIG. 19, there is the problem of a possibility of concentration of high-speed calls at one frequency, so that a smaller number of calls can be accommodated. In addition, numerous fluctuations lead to difficulty in TPC (transmission power control), so that the number of calls accommodated is reduced even further.

A first technology of the prior art is a method of allocation of high-speed wireless channels to mobile stations insofar as possible (see Japanese Patent Laid-open No. 2003-125440). This first technology of the prior art is a method, when a control station is to allocate a wireless channel to a mobile station, of selecting a wireless channel enabling high-speed communication with a mobile station from among a plurality of wireless channels, and of preferentially allocating the wireless channel to a mobile station.

As a second technology of the prior art, a method of controlling the transmission rate according to the QoS has been proposed (Japanese Patent Laid-open No. 2003-179966). This second technology of the prior art provides a service which preserves fairness of service, with substantially the same QoS provided, to users of the same service class, and preserves fairness of service, with relative QoS maintained among classes, by maintaining a predetermined ratio of transmission rates among users of different classes.

The first technology of the prior art is a method of allocation of high-speed wireless channels to mobile stations insofar as possible, and does not increase the number of mobile stations (number of calls) accommodated by a base station. The second technology of the prior art provides a service which controls the transmission rate according to the Qos to preserve fairness, and similarly does not increase the number of calls accommodated by a base station.

SUMMARY OF THE INVENTION

In light of the above, an object of this invention is to provide a base station control apparatus and frequency allocation method for the apparatus capable of increasing the number of calls which can be accommodated.

A further object of this invention is to allocate frequencies to calls such that the statistical multiplexing effect can be exhibited, so as to increase the number of calls which can be accommodated.

A further object of this invention is to render the distribution of calls for each call type uniform among frequencies, so as to increase the number of calls which can be accommodated.

This invention attains the above objects by means of a frequency allocation method in a code division multiplex communication system capable of utilizing a plurality of frequencies.

In a first frequency allocation method of this invention, the allocation conditions of calls for each frequency among the above plurality of frequencies is evaluated for at least one call type among a plurality of call types, and when performing frequency allocation for a new call belonging to the one call type, a frequency is specified which is capable of alleviating unevenness in the allocation conditions of calls for the one call type among the above frequencies, based on the above evaluation results, and the specified frequency is allocated to communication for the new call.

In a second frequency allocation method of this invention, the allocation conditions of calls for each frequency among the above plurality of frequencies is evaluated for each of low-speed communication call type and high-speed communication call type, and when performing frequency allocation for a new low-speed communication call, a frequency is specified with a small number of calls of the above low-speed communication call type, or a frequency is specified with a large number of calls of the above high-speed communication call type, or a frequency is specified for which high-speed communication calls constitute a large proportion of all communication calls, and the new low-speed communication call is allocated to the specified frequency.

In a third frequency allocation method of this invention, the remaining allocable resources at each frequency and the number of calls of each call type to which the frequencies are allocated are monitored, and when a predetermined specific frequency can be allocated to a new call by taking the remaining resources into consideration, the specified frequency is allocated to the call, but when the above specified frequency cannot be allocated to above new call, any of the frequencies other than the above specified frequency is allocated to the new call, such that unevenness in the distribution of calls for each call among the frequencies does not occur.

In a fourth frequency allocation method of this invention, the remaining allocable resources at each frequency and the number of calls of each call type to which the frequencies are allocated are monitored, and when a predetermined specific frequency can be allocated to a new call by taking the remaining resources into consideration, one frequency among all the frequencies including said specific frequency is allocated to the new call such that unevenness in the distribution of calls for each call type among said frequencies does not occur, but when the above specified frequency cannot be allocated to above new call, any of the frequencies other than the above specified frequency is allocated to the new call, such that unevenness in the distribution of calls for each call type among said frequencies does not occur.

Further, through this invention, the above objects are attained by a base station control apparatus in a code division multiplex communication system capable of utilizing a plurality of frequencies.

A base station control apparatus of this invention comprises means for evaluating, for at least one call type among a plurality of call types, the allocation conditions of calls of each frequency of the above plurality of frequencies; means for specifying, when frequency allocation to a new call belonging to the one call type is to be performed, a frequency capable of alleviating unevenness in the conditions of allocation of the one call type among the above frequencies, based on the above evaluation results; and means for allocating the specified frequency to communication of the new call.

Through this invention, frequencies are allocated to calls in such a way that the statistical multiplexing effect is exhibited, so that the number of calls accommodated by the base station can be increased.

Through this invention, the distribution of the calls for each call type among frequencies is rendered equal, so that concentration of high-speed calls at a given frequency, and a reduction in the number of calls accommodated, can be prevented, and through the statistical multiplexing effect, the number of calls which can be accommodated can be increased.

Other features and advantages of the present invention will be apparent from the following description taken in conjunction with the accompanying drawings.

DESCRIPTION OF THE PREFERRED EMBODIMENTS

Outline of the Invention

Figure 1:
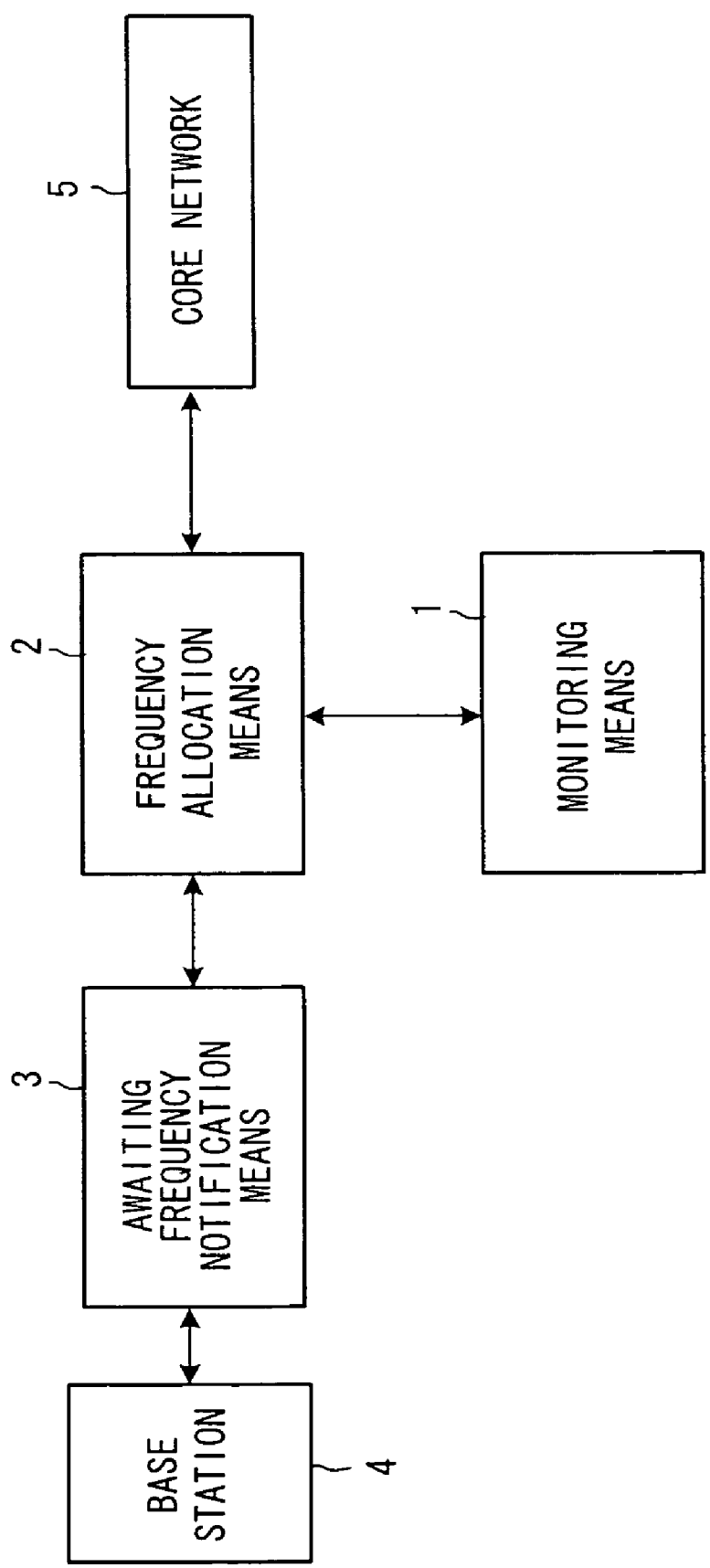
FIG. 1 shows the functional configuration of a base station control apparatus of this invention.
Figures 4, 5:
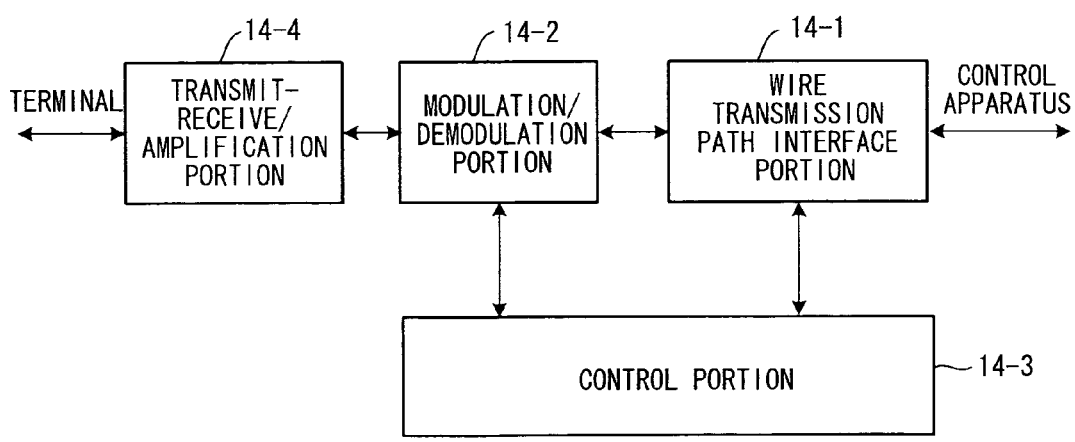
FIG. 4 is an example of a table holding the number of calls, by call type, to which each frequency has been allocated.
FIG. 5 is a block diagram of a base station.

FIG. 1 shows the functional configuration of a base station control apparatus of this invention, comprising means 1 for monitoring, for each frequency, the number of calls for each call type to which the frequency is allocated; frequency allocation means 2 for allocating one of the frequencies among all frequencies, when a new call occurs, to the call such that unevenness in the distribution of calls for each call type among the frequencies does not occur; and means 3 for issuing notification of a new awaiting frequency when a frequency differing from an initial awaiting frequency is designated for a terminal. In this base station control apparatus, the monitor means 1 monitors, for each frequency, the number of calls for each call type to which the frequency is allocated for communication, and when a new call occurs, the allocation means 2 allocates a frequency for communication such that unevenness in the distribution of calls for each call type among the frequencies does not occur, and the notification means 3 issues notification to the terminal, using wireless communication means of the base station 4, of the communication frequency, as a new awaiting frequency. The terminal sets the frequency of the notification as the new awaiting frequency, and again issues an originating call using that frequency. Because the frequency was selected in consideration of the distribution of calls for each type, the base station control apparatus allocates the frequency for communication such that communication at that frequency is permitted. In the FIG. 5 is the core network.

If, as in the prior art, calls which cannot be allocated to a communication frequency (overflow calls) are simply allocated to another free frequency, a phenomenon in which calls requiring high power levels are concentrated at some frequencies cannot be avoided, and so the number of calls which can be accommodated by the system is reduced. However, by allocating each frequency for communication to calls such that the distribution of the number of calls for each call type, is uniform for each frequency, as in this invention, a decline in the channel concentration effect can be avoided, and the number of subscriber channels which can be accommodated by the system can be increased.

The notification of a change in the awaiting frequency prompts a change in the control channel to perform call origination or similar: And by having the terminal use the changed control channel to originate calls, in effect a communication channel at the changed frequency is allocated. This method is appropriate for a system in which, as a rule, a control channel is provided for each frequency and when a communication channel of the frequency is allocated, a call is originated using the control channel of this frequency.

If the system permits allocation of communication channels at frequencies differing from control channels, then the frequency allocation of this invention may also be realized by directly allocating to the terminal a communication channel at a frequency differing from the control channel frequency at the time of call origination, without changing the awaiting frequency.

EMBODIMENTS (A) System Configuration

Figure 2:
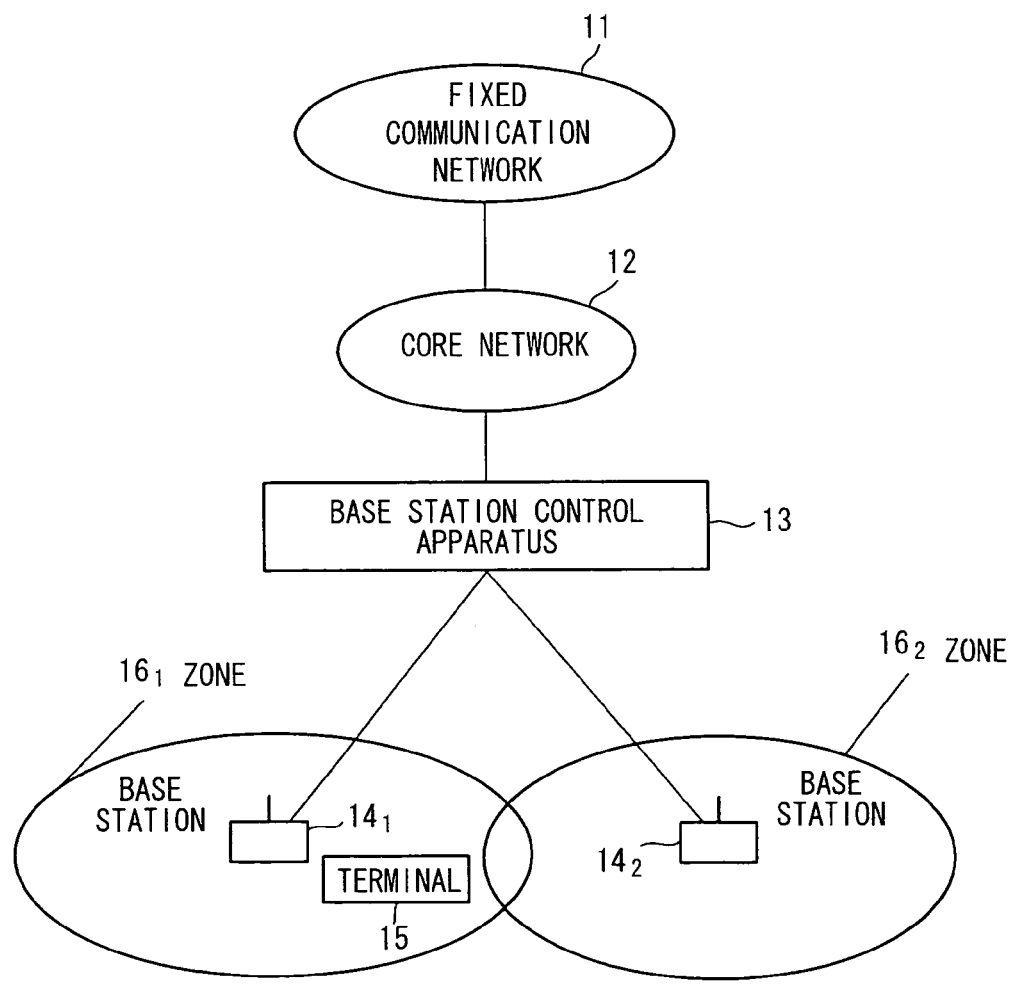
FIG. 2 shows the configuration of a communication system to which this invention can be applied.

FIG. 2 shows the configuration of a communication system to which this invention can be applied, comprising a fixed communication network 11; a core network 12 provided between the fixed communication network and the base station control apparatus; a base station control apparatus 13 provided between the core network and a plurality of base stations, and which controls the base stations; base stations $14_1$, $14_2$ which are controlled by the base station control apparatus 13, and which receive data from the base station control apparatus and transmit information to mobile stations (terminals), and moreover which transmit data from terminals to the base station control apparatus; and numerous terminals (only one of which is shown in the figure) 15 which perform wireless communication with base stations. Areas covered by each of the base stations are indicated by the zones $16_1$, $16_2$.

The base stations $14_1$, $14_2$ are each configured to multiplex a plurality of frequencies, and also to perform code division multiplexing of a plurality of signals at the same frequency and transmit the resulting signal, in code division multiplex transmission enabling simultaneous wireless communication with numerous subordinate terminals. When a call (originating call) is generated by a terminal, or when a call (terminating call) arrives from the core network 12, the base station control apparatus 13 executes control to determine to which frequency the call will be allocated and to notify the base station and terminal, so that the base station and terminal communicate at that frequency.

Figure 3:
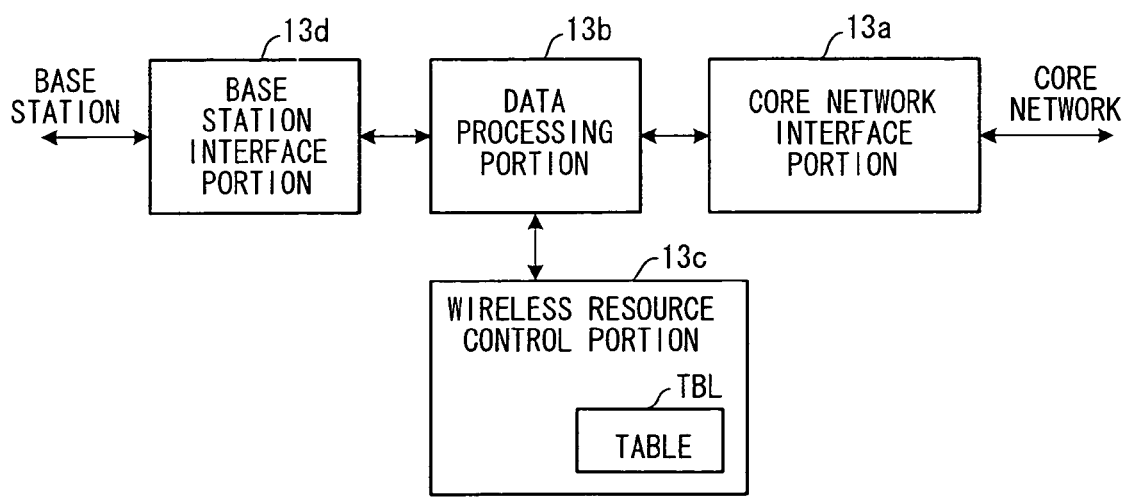
FIG. 3 is a block diagram of a base station control apparatus.

FIG. 3 is a block diagram of the base station control apparatus 13. The core network interface portion 13a exchanges data with the core network 12, and transmits data from the core network to the data processing portion 13b. The data processing portion 13b maps data input from the core network interface portion 13a and data (terminal control signals, base station control signals) input from the wireless resource control portion 13c to logical channels. The data processing portion 13b also extracts the data portion from terminal control signals (control signals sent from terminals) and from base station control signals (control signals sent from the base station) which are input from the base station interface portion 13d, and sends the data portion to the wireless resource control portion 13c. Further, the data processing portion 13b executes logical channel transmission/transmission halting control, and allocates frequencies to calls, according to instructions from the wireless resource control portion 13c.

The base station interface portion 13d transmits the terminal control signals and base station control signals sent from the data processing portion 13b to the base stations $14_1$, $14_2$, and transmits the terminal control signals and base station control signals sent from base stations to the data processing portion 13b.

The wireless resource control portion 13c performs allocation and management of wireless resources such as frequencies and spreading codes for communication between base stations and terminals. The wireless resource control portion 13c judges movement between zones based on peripheral cell quality measurement information from terminals. In order to allocate and manage wireless resources, the wireless resource control portion1 13c maintains, for each subordinate base station, a table TBL as shown in FIG. 4. This table includes, for each frequency $RFj(j=1,2,...N)$, the number of calls cn-RFj, bn-RFj, an-RFj to which the frequencies RFj is allocated for communication for each call type (high-speed, intermediate-speed, low-speed calls), as well as the amounts of available resources RTH, resources currently in use Ru, and remaining resources Re. Call types are here classified into high-speed call type, intermediate-speed call type, and low-speed call type; but more detailed classification, or classification into only high- and low-speed call types, are also possible.

A call type can be decided based on the call bitrate (or the bandwidth required); but call types based on power required, that is, classification as high-power, intermediate-power, and low-power call types corresponding to the high-speed, intermediate-speed and low-speed call types, is also possible. In a cellular system in which power control is performed, the base station transmission power differs even for the same call type. Control is executed to increase the base station transmission power for transmission to a mobile station distant from the base station, or to a mobile station affected by interference from a neighboring base station. Consequently channel selection for frequency reassignment is performed on the basis not of the bitrate, but of the actual transmission power. In the above-described table, for example, a low-speed call is a call with required power of 500 mW or below; an intermediate-speed call has required power of 500 mW to 1000 mW; and a high-speed call has required power of 1000 mW or above.

FIG. 5 is a block diagram of the base station. The wire transmission path interface portion 14-1 sends, to the modulation/demodulation portion 14-2, data and terminal control signals sent from the base station control apparatus 13 via a logical channel, and sends base station control signals to the control portion 14-3. Also, the wire transmission path interface portion 14-1 sends data and terminal control signals input from the modulation/demodulation portion 14-2, and base station control signals input from the control portion 14-3 to the base station control apparatus 13.

The modulation/demodulation portion 14-2 performs error correction encode processing, modulation processing, and frequency conversion processing of data and terminal control signals sent from the wire transmission path interface portion 14-1 according to instructions from the control portion 14-3.

The modulation/demodulation portion 14-2 also performs demodulation and error correction of terminal control signals and data sent from terminals according to instructions from the control portion 14-3, inputs the result to the wire transmission path interface portion 14-1, and inputs control signals from terminals to base stations, to the control portion 14-3. Also, the modulation/demodulation portion 14-2 performs transmission/transmission halt processing according to instructions from the control portion 14-3.

The transmit-receive/amplification portion 14-4 receives signals at various frequencies from terminals and amplifies the signals using a low-noise amplifier, as well as amplifying modulated signals at various frequencies input from the modulation/demodulation portion 14-2 using a transmission power amplifier and transmitting the signals to terminals from an antenna.

The control portion 14-3 receives base station control signals from the wire transmission path interface portion 14-1, and instructs the modulation/demodulation portion 14-2 to set the wireless resources (frequencies and the multiplex timing for frequencies, or spreading codes). The control portion 14-3 receives base station control signals from the wire transmission path interface portion 14-1, and instructs the modulation/demodulation portion 14-2 to set transmission/transmission halted for physical channels.

(B) Summary of Frequency Allocation Control of this Invention (a) First Frequency Allocation Control Method In a first frequency allocation control method of this invention, (1) for each frequency, remaining allocatable resources and the number of calls of to which the frequency is allocated for each call type, are monitored; (2) when, upon occurrence of a call, a frequency (the same frequency as the awaiting frequency) can be allocated to the new call by taking remaining resources into account, the frequency is allocated to the call; (3) when, upon occurrence of a call, a frequency (the same frequency as the awaiting frequency) cannot be allocated to the new call, another awaiting frequency is allocated to the call, such that no unevenness occurs in the distribution of calls for each call type among frequencies.

Figure 6:
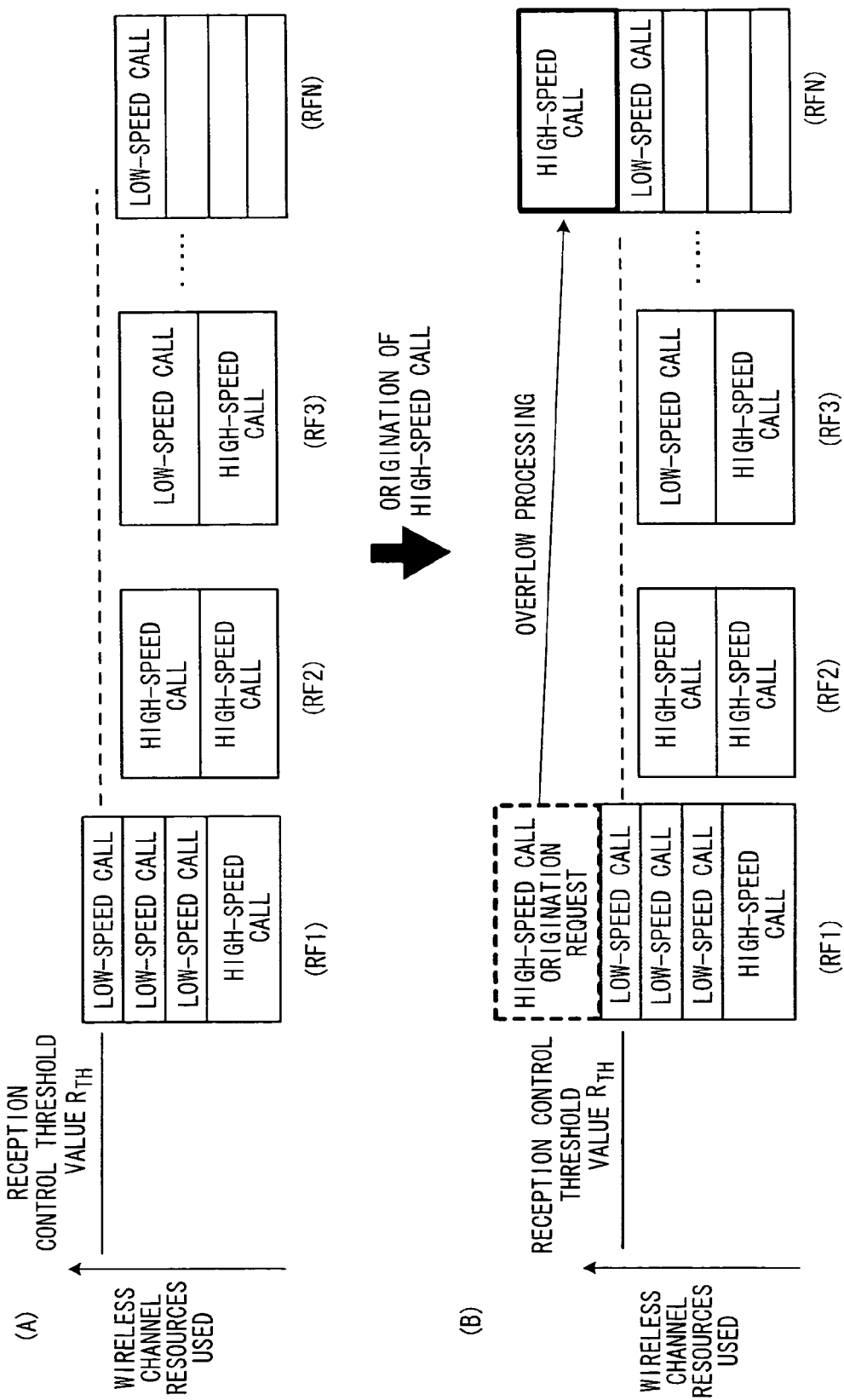
FIG. 6 explains a first frequency allocation control method when a high-speed call occurs.

FIG. 6 explains a first frequency allocation control method when a high-speed call occurs. The upper diagram (A) shows the distribution of calls of each frequency prior to allocation; short rectangles denote calls of low-speed call type, and tall rectangles denote calls of high-speed call type. It is assumed that at the frequency RF1, resources used for communication already exceed the control threshold RTH. When a terminal originates a call at frequency RF1, the frequency RF1 cannot be allocated for communication to a new high-speed call, and so the base station control apparatus 13 specifies another frequency, such that unevenness in the distribution of calls for each call type among frequencies does not occur. For example, as shown in (B), a frequency RFN to which the number of calls of the call type of the new call (in the example of FIG. 6, a high-speed call type) is smallest is specified, and the terminal is notified of this frequency RFN. The terminal sets this frequency RFN as the awaiting frequency and originates a call using this frequency, and a communication channel of this frequency is allocated. Or, a communication channel of a frequency differing from the frequency at the time of call origination is directly allocated.

When allocating RF1, RF1 is allocated as-is for communication use.

Figure 7:
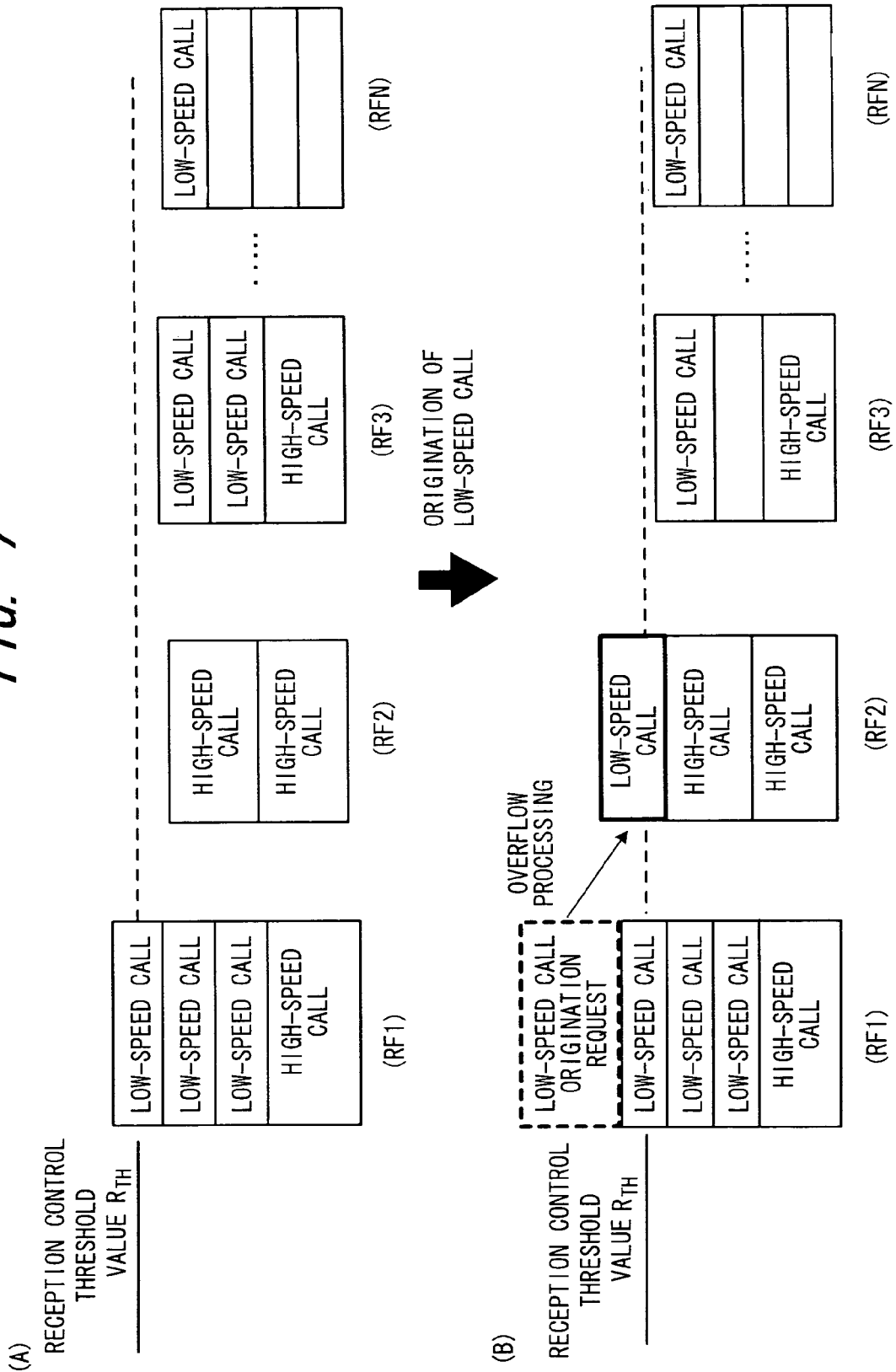
FIG. 7 explains a first frequency allocation control method when a low-speed call occurs.

FIG. 7 explains the second frequency allocation control method when a low-speed call occurs. The upper diagram (A) shows the distribution of calls of each frequency prior to allocation. It is assumed that the resources used for communication of the frequency RF1 already exceed the control threshold RTH.

Because the frequency RF1 cannot be allocated for communication to a new low-speed call, the base station control apparatus 13 specifies a frequency such that no unevenness occurs in the distribution of calls for each call type among frequencies. For example, as shown in (B), the frequency RF2, to which the smallest number of calls of the same call type as the new call (in the example of FIG. 7, a low-speed call type) are allocated, is specified. When the frequency RF1 can be allocated to the new call, RF1 is allocated as a communication frequency to the call.

Instead of the above-described frequency specification, the frequency to which the greatest number of calls of the high-speed call type has been allocated, can also be specified in a case where the call type of the new call is a low-speed call type.

(b) Second Frequency Allocation Control Method

In the second frequency allocation control method of this invention, (1) for each frequency, the number of calls for each call type to which the frequency has been allocated is monitored; and, (2) when a new call occurs, a frequency among all the frequencies is allocated to the call, such that no unevenness occurs in the distribution of calls for each call types among frequencies.

Figure 8:
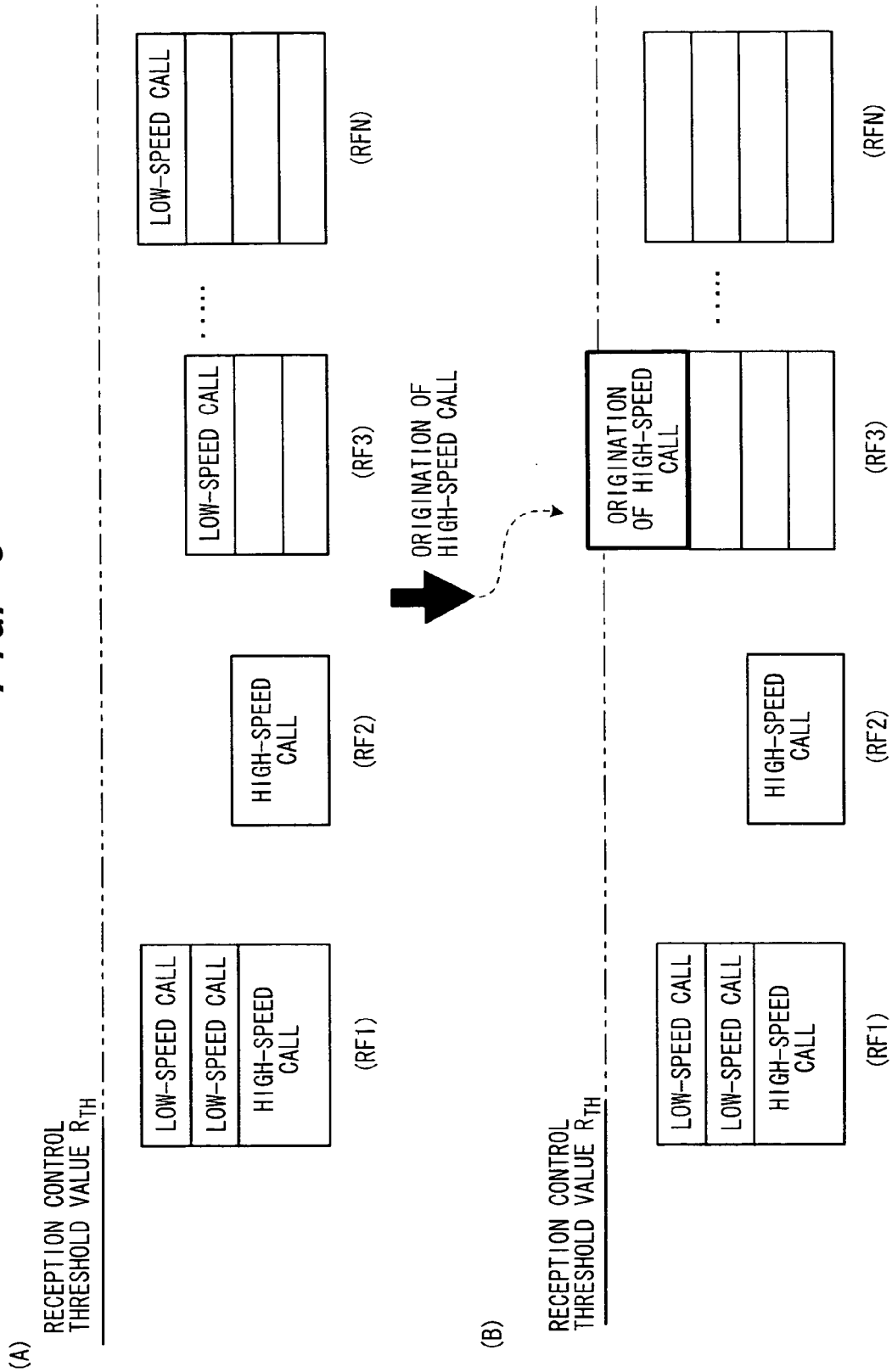
FIG. 8 explains a second frequency allocation control method when a high-speed call occurs.

FIG. 8 explains the second frequency allocation control method when a high-speed call occurs. The upper diagram (A) shows the distribution of calls of each frequency prior to allocation; short rectangles denote calls of low-speed call type, and tall rectangles denote calls of high-speed call type.

When a terminal originates a call at frequency RF1, even if communication channel allocation at frequency RF1 is possible, a frequency among all frequencies in including frequency RF1 is allocated such that no unevenness occurs in the distribution of calls for each call type among frequencies.

When a new high-speed call occurs at RF1, as shown in (B), the base station control apparatus 13 selects a frequency among all frequencies to which the smallest number of calls of the high-speed call type has been allocated. In the example of the figure, the frequencies RF3 and RFN have been allocated the smallest number of times, namely zero, to high-speed calls, and either can be allocated to the high-speed call. In such a case, the base station control apparatus 13 selects the frequency RF3, with a small amount of total used resources, and allocates the frequency RF3 to the high-speed call. When the frequency allocated to the new call is different from the awaiting frequency, the terminal is notified that the allocated frequency is the new awaiting frequency.

In a system which permits allocation of a communication channel of a frequency different from the control channel frequency, when a frequency differing from that of control channel is allocated for a communication channel, the frequency is directly allocated to the terminal as a communication channel frequency.

In this way, communication frequencies are switched such that unevenness in the distribution of calls for each call type among frequencies does not occur, so that the statistical multiplexing effect can be maintained continuously.

Figure 9:
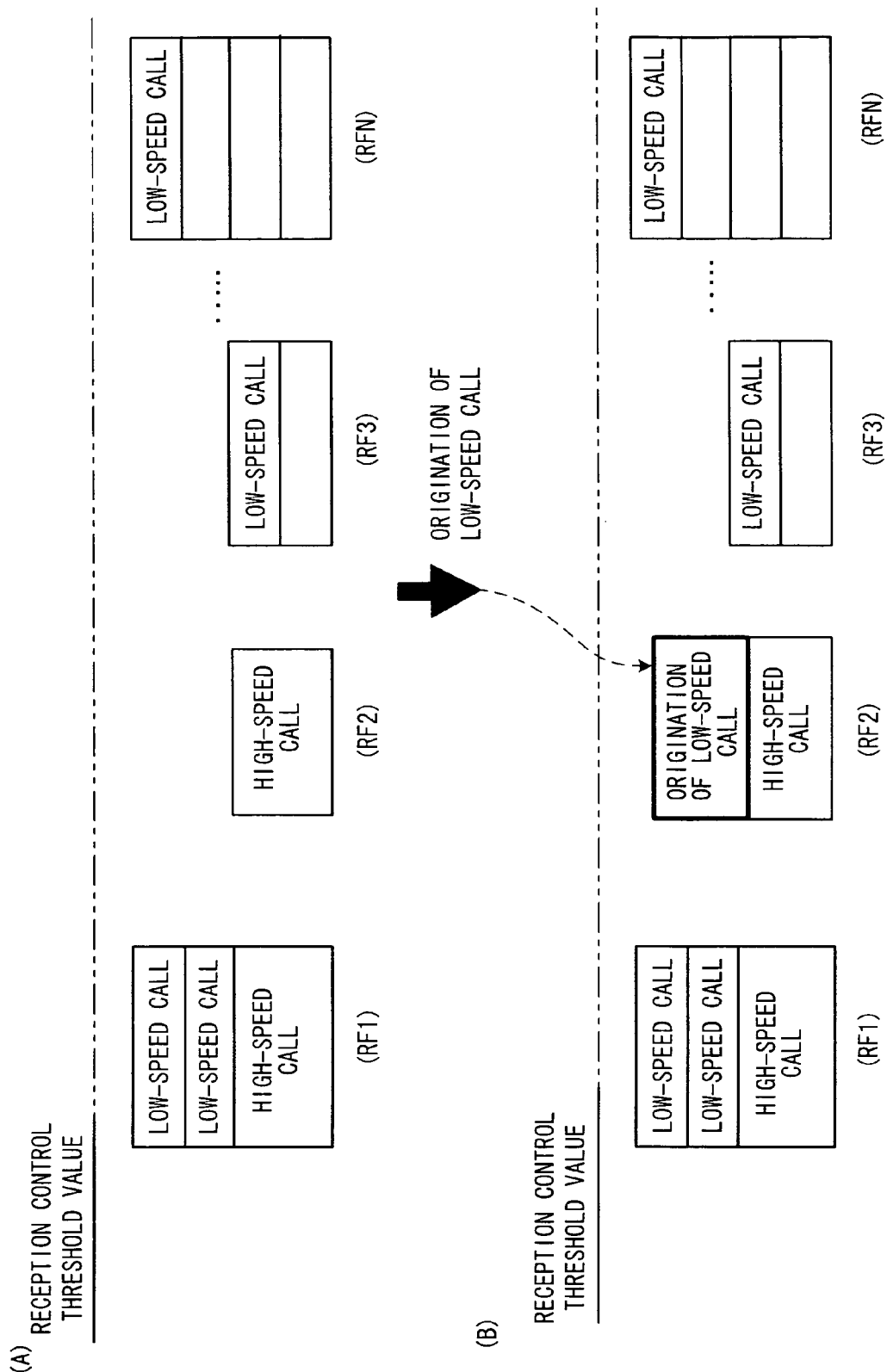
FIG. 9 explains a second frequency allocation control method when a low-speed call occurs.

FIG. 9 explains the second frequency allocation control method when a low-speed call occurs; the upper figure (A) shows the distribution of calls of each frequency prior to allocation. When a new low-speed call occurs, as shown in (B), the base station control apparatus 13 selects from among all frequencies a frequency to which the smallest number of calls of low-speed call type have been allocated. In the example of the figure, the frequency RF2 is allocated to the smallest number calls of low-speed call type, namely zero, and so the frequency RF2 is allocated to the low-speed call. When the frequency allocated to the new call is different from the awaiting frequency, the terminal is notified of the allocated frequency as the new awaiting frequency.

In a permission which permits allocation of communication channels of frequencies differing from the control channel frequency, when a frequency differing from that of the control channel is allocated for communication channel, the frequency is allocated directly to the terminal as a communication channel frequency.

As described above, communication frequencies are switched such that no unevenness occurs in the distribution of calls for each call type among frequencies, so that the statistical multiplexing effect can be maintained continuously.

(c) Third Frequency Allocation Processing Method

FIG. 6 and FIG. 7 explains allocation of a communication channel of the same frequency as the awaiting frequency to a new call when the same frequency as the awaiting frequency of the call is to be allocated. However, the following control may be employed instead. Even if the communication channel with the same frequency as the frequency of call origination can be allocated, one frequency among all frequencies is allocated to the call such that no unevenness occurs in the distribution of calls for each call type among all frequencies, or among a prescribed number of two or more frequencies. When the frequency allocated to the new call differs from the awaiting frequency, the terminal is notified of the allocated frequency as the new awaiting frequency.

In a system which permits allocation of a communication channel of a frequency differing from the control channel frequency, when a frequency differing from that of the control channel is allocated for communication channel, the frequency is directly allocated to the terminal as a communication channel frequency.

In this way, communication frequencies are switched such that no unevenness occurs in the distribution of calls for each call type among frequencies, so that the statistical multiplexing effect can be maintained continuously.

Figure 10:
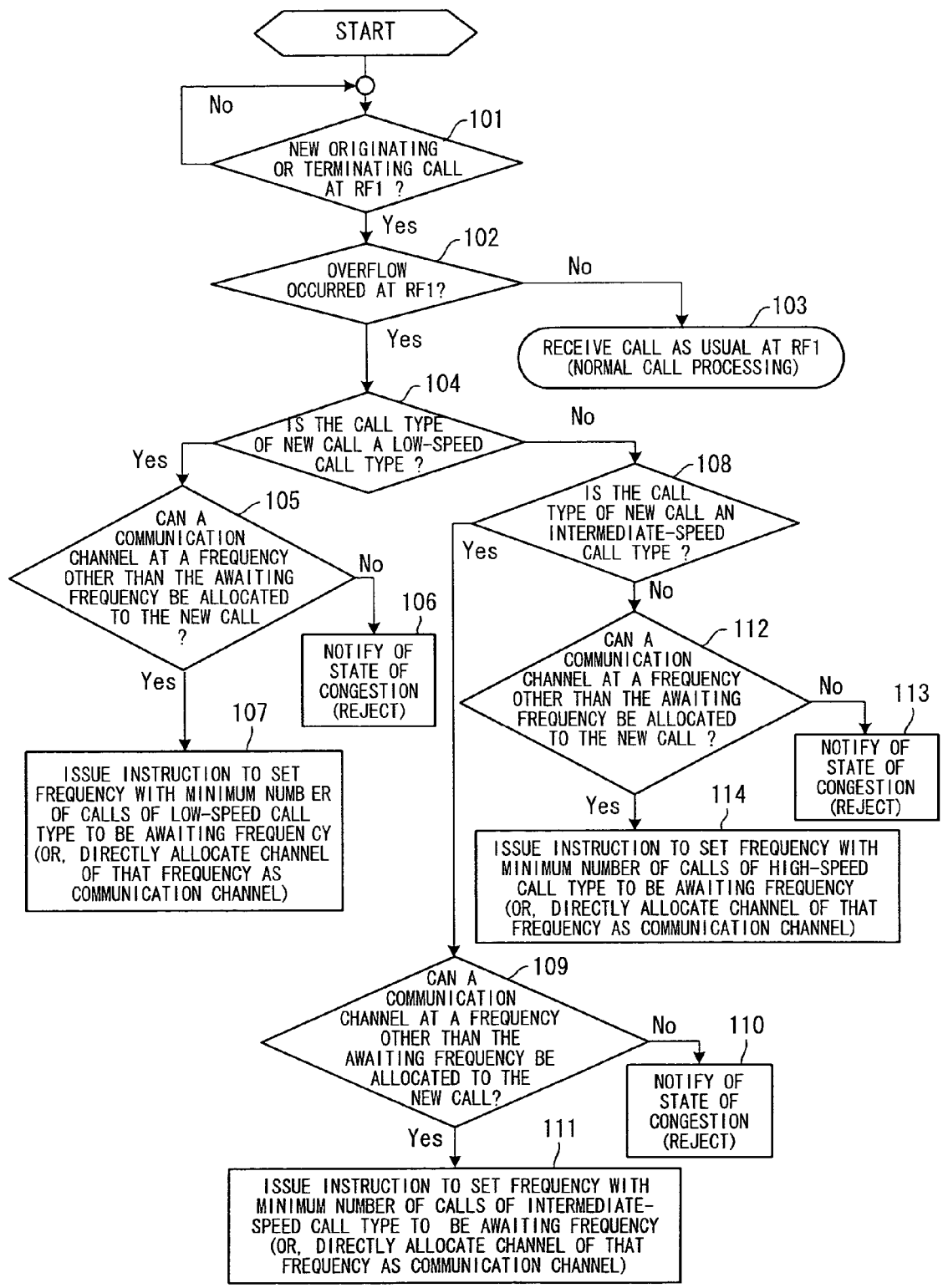
FIG. 10 shows the flow of processing for the first frequency allocation control method.

(C) Frequency Allocation Processing of this Invention (a) First Frequency Allocation Processing Method FIG. 10 shows the processing flow for the first frequency allocation control method explained in FIG. 6 and FIG. 7. The awaiting frequency is assumed to be frequency RF1.

The wireless resource control portion 13c of the base station control apparatus 13 monitors whether the terminal 15 has originated a new call, or whether a new terminating call has arrived from the core network 12 (step 101).

If a new call has been originated, a check is performed as to whether a communication channel at the frequency RF1 can be allocated to the call by taking into account the remaining communication resources at the same RF1 as the awaiting frequency and the resources required by the call (step 102). If the frequency RF1 can be allocated to the call, a communication channel at the frequency RF1 is allocated, and the contents of the table TBL are updated (step 103).

However, if the frequency RF1 cannot be allocated to the new call, a check is performed as to whether call type of the new call is a low-speed call type (step 104); if the call type is a low-speed call type, a check is performed as to whether a channel at another remaining frequency other than the awaiting frequency can be allocated for communication to the new call (step 105), and if allocation is not possible, a state of congestion exists, so that call connection is rejected, and the terminal 15 or the core network 12 is notified of the state of congestion (step 106). On the other hand, if in step 105 a frequency among the remaining frequencies excluding the frequency RF1 which is the same as the awaiting frequency can be allocated to the new call, then the frequency which has been allocated to the smallest number of calls of the low-speed call type is determined, this frequency is allocated to the new call, and the contents of the table TBL are updated (step 107). When the frequency allocated to the new call is different from the awaiting frequency, the terminal 15 is notified of the new awaiting frequency. In a system which permits allocation of a communication channel of a frequency differing from the control channel frequency, when a frequency differing from that of the control channel is allocated for a communication channel, the frequency is directly allocated to the terminal as a communication channel frequency.

On the other hand, if in step 104 the call type of the new call is not a low-speed call type, then a check is performed as to whether the call is an intermediate-speed call type (step 108), and if the call type is an intermediate-speed call type, a check is performed as to whether a remaining frequency other than the frequency RF1 which is the same as the awaiting frequency can be allocated to the new call (step 109); if allocation is not possible, a state of congestion exists, so that call connection is rejected, and the terminal 15 or the core network 12 is notified of the state of congestion (step 110). On the other hand, if in step 109 a frequency among the remaining frequencies excluding the frequency RF1 which is the same as the awaiting frequency can be allocated to the new call, then the frequency which has been allocated to the smallest number of calls of the intermediate-speed call type is determined, this frequency is allocated to the new call, and the contents of the table TBL are updated (step 111). When the frequency allocated to the new call is different from the awaiting frequency, the terminal 15 is notified of the new awaiting frequency. In a system which permits allocation of a communication channel of a frequency differing from the control channel frequency, when a frequency differing from that of the control channel is allocated for a communication channel, the frequency is directly allocated to the terminal as a communication channel frequency.

If in step 108 the call type of the new call is not an intermediate-speed call type, then it is a high-speed call type, and so a check is performed as to whether a channel at another remaining frequency other than the awaiting frequency can be allocated for communication to the new call (step 112), and if allocation is not possible, a state of congestion exists, so that call connection is rejected, and the terminal 15 or the core network 12 is notified of the state of congestion (step 113). On the other hand, if in step 112 a frequency among the remaining frequencies excluding the frequency RF1 which is the same as the awaiting frequency can be allocated to the new call, then the frequency which has been allocated to the smallest number of calls of the high-speed call type is determined, this frequency is allocated to the new call, and the contents of the table TBL are updated (step 114). When the frequency allocated to the new call is different from the awaiting frequency, the terminal 15 is notified of the new awaiting frequency.

In a system which permits allocation of a communication channel of a frequency differing from the control channel frequency, when a frequency differing from that of the control channel is allocated for a communication channel, the frequency is directly allocated to the terminal as a communication channel frequency.

(b) Second Frequency Allocation Processing Method

Figure 11:
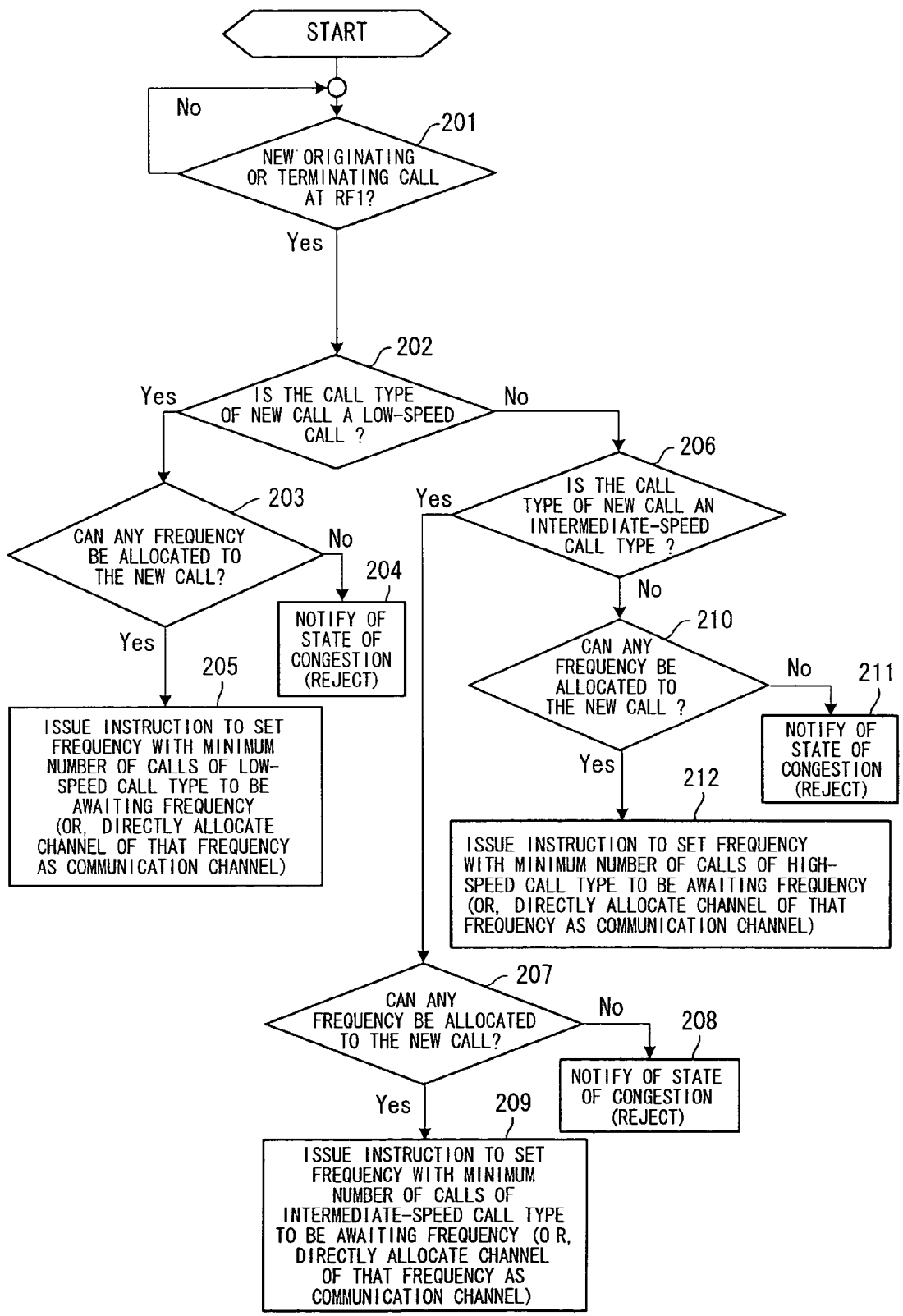
FIG. 11 shows the flow of processing for the second frequency allocation control method.

FIG. 11 shows the flow of processing for the second frequency allocation control method explained in FIG. 8 and FIG. 9. The awaiting frequency is assumed to be frequency RF1.

The wireless resource control portion 13c of the base station control apparatus 13 monitors whether the terminal 15 originates a new call, or whether a new terminating call arrives from the core network 12 (step 201).

If a new call is originated, a check is performed as to whether the call type of the new call is a low-speed call type (step 202), and if the call type is a low-speed call type, a check is performed as to whether there exists a frequency among all frequencies including the same frequency as the awaiting frequency, which can be allocated to the new call (step 203). If there is no such frequency, a state of congestion exists, and so the call connection is rejected, and the terminal 15 or the core network 12 is notified of the state of congestion (step 204). On the other hand, if in step 203 there exists a frequency among all frequencies including the same frequency as the awaiting frequency, which can be allocated to the new call, then the frequency allocated to the smallest number of calls of the low-speed call type is determined, this frequency is allocated to the new call, and the contents of the table TBL are updated (step 205). If the frequency allocated to the new call is the same as the awaiting frequency, no further action is taken, but if the frequency is different, the terminal 15 is notified of the new awaiting frequency. In a system which permits allocation of a communication channel of a frequency differing from the control channel frequency, when a frequency differing from that of the control channel is allocated for a communication channel, the frequency is directly allocated to the terminal as a communication channel frequency.

On the other hand, if in step 202 the new call is not a low-speed call, then a check is performed as to whether the call type of the new call is an intermediate-speed call type (step 206), and if the call type is an intermediate-speed call type, a check is performed as to whether there exists a frequency among all frequencies including the same frequency as the awaiting frequency, which can be allocated to the new call (step 207). If there is no such frequency, a state of congestion exists, and so the call connection is rejected, and the terminal 15 or the core network 12 is notified of the state of congestion (step 208). On the other hand, if in step 207 there exists a frequency among all frequencies including the same frequency as the awaiting frequency, which can be allocated to the new call, then the frequency allocated to the smallest number of calls of the intermediate-speed call type is determined, this frequency is allocated to the new call, and the contents of the table TBL are updated (step 209). If the frequency allocated to the new call is different from the awaiting frequency, the terminal 15 is notified of the new awaiting frequency. In a system which permits allocation of a communication channel of a frequency differing from that of the control channel frequency, when a frequency differing from the control channel frequency is allocated as a communication channel, the frequency is directly allocated to the terminal as a communication channel frequency.

If in step 206 the call type of the new call is not an intermediate-speed call type, then it is a high-speed call type, and a check is performed as to whether there exists a frequency among all frequencies including the same frequency as the awaiting frequency, which can be allocated to the new call (step 210). If there is no such frequency, a state of congestion exists, and so the call connection is rejected, and the terminal 15 or the core network 12 is notified of the state of congestion (step 211). On the other hand, if in step 210 there exists a frequency among all frequencies including the same frequency as the awaiting frequency, which can be allocated to the new call, then the frequency allocated to the smallest number of calls of the high-speed calls is determined, this frequency is allocated to the new call, and the contents of the table TBL are updated (step 212). If the frequency allocated to the new call is different from the awaiting frequency, the terminal 15 is notified of the new awaiting frequency. In a system which permits allocation of a communication channel of a frequency differing from the control channel frequency, when a frequency differing from that of the control channel is allocated for a communication channel, the frequency is directly allocated to the terminal as a communication channel frequency.

(c) Third Frequency Allocation Processing Method

Figure 12:
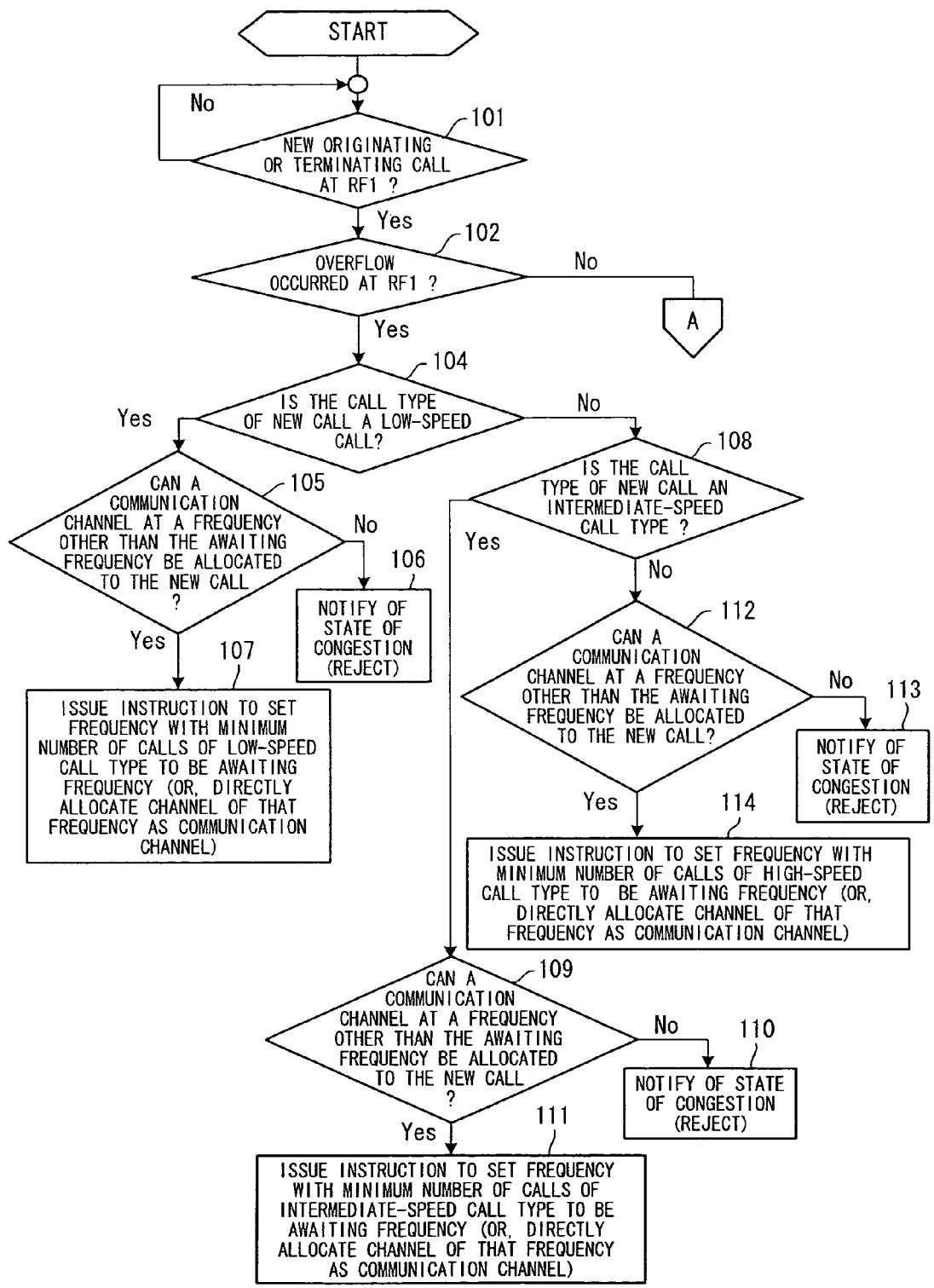
FIG. 12 shows the (first portion) of the flow of processing for a third frequency allocation control method.
Figure 13:
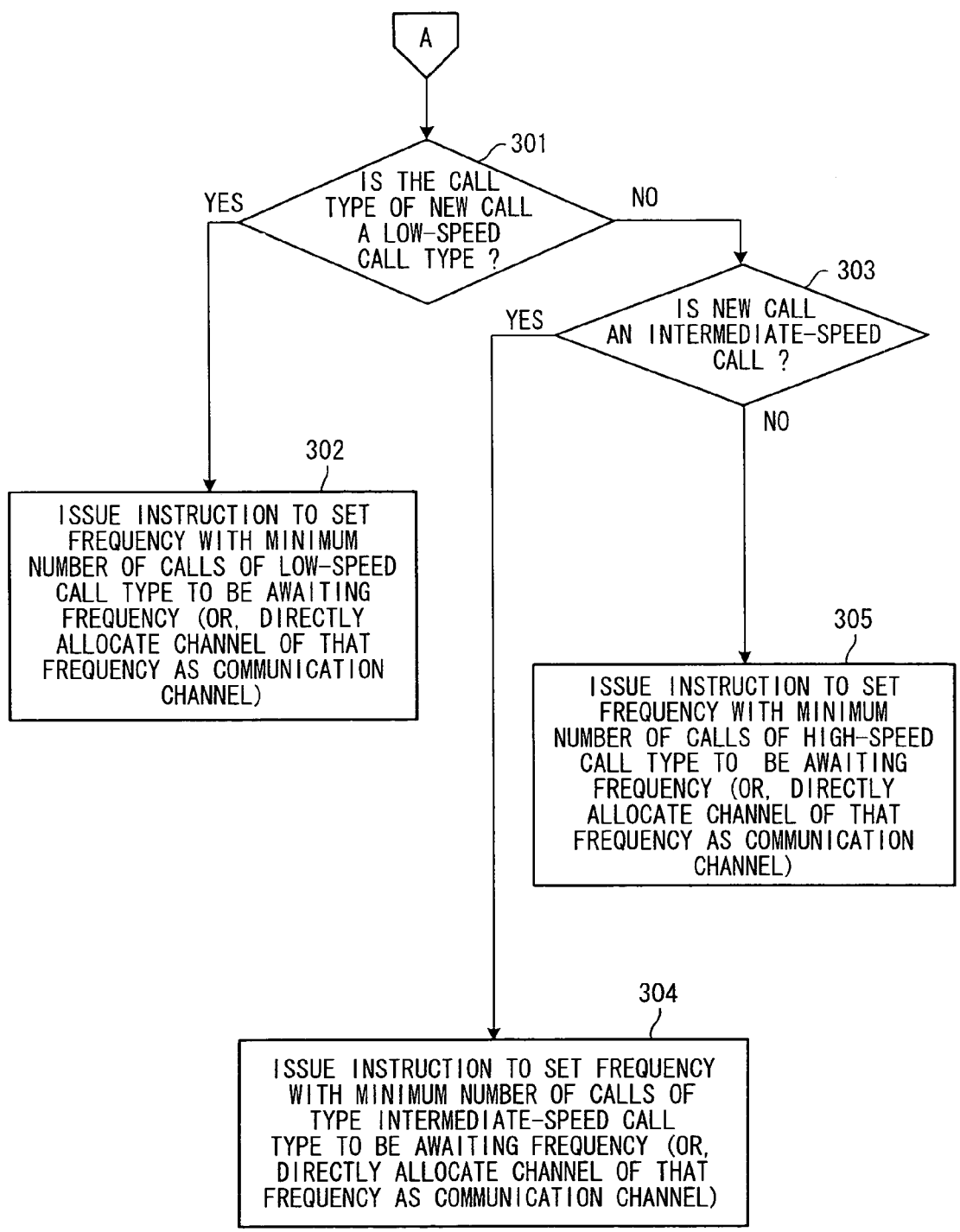
FIG. 13 shows the (second portion) of the flow of processing for a third frequency allocation control method.

FIG. 12 and FIG. 13 show the flow of processing for a third frequency allocation control method. The awaiting frequency is assumed to be frequency RF1. Portions which are the same as portions in the first processing flow of FIG. 10 are assigned the same symbols. In the third frequency allocation processing method, a difference with the first processing flow of FIG. 10 is the processing of steps 301 to 305 which are performed when it is judged in step 102 that the same frequency RF1 as the awaiting frequency is allocated to the new call. In a case where the awaiting frequency RF1 cannot be allocated to the new call, the same processing as the processing of steps 104 to 114 in FIG. 10 are performed.

In step 102, when the same frequency RF1 as the awaiting frequency can be allocated to the new call, the wireless resource control portion 13c of the base station control apparatus 13 checks whether the type of the new call is a low-speed call type (FIG. 13, step 301). If the type of the new call is a low-speed call type, a frequency allocated to the smallest number of calls of the low-speed call type among all frequencies including the same frequency as the awaiting frequency, is determined, this frequency is allocated to the new call, and the contents of the table TBL are updated (step 302). If the frequency allocated to the new call differs from the awaiting frequency, the terminal 15 is notified of the new awaiting frequency. In a system which permits allocation of a communication channel of a frequency differing from the control channel frequency, when a frequency differing from that of the control channel frequency is allocated for a communication channel, the frequency is directly allocated to the terminal as a communication channel frequency.

On the other hand, if in step 301 the type of the new call is not a low-speed call type, then a check is performed as to whether the new call type is an intermediate-speed call type (step 303). If the new call type is an intermediate-speed call type, the frequency allocated to the smallest number of calls of the intermediate-speed call type among all frequencies including the same frequency as the awaiting frequency, is determined, this frequency is allocated to the new call, and the contents of the table TBL are updated (step 304). If the frequency allocated to the new call differs from the awaiting frequency, the terminal 15 is notified of the new awaiting frequency. In a system which permits allocation of a communication channel of a frequency differing from the control channel frequency, when a frequency differing from that of the control channel is allocated for a communication channel, the frequency is directly allocated to the terminal as a communication channel frequency.

If in step 303 the call type of the new call is not an intermediate-speed call type, then the call type of the new call is a high-speed call type, and so a frequency allocated to the smallest number of calls of the high-speed calls among all frequencies including the same frequency as the awaiting frequency, is determined, this frequency is allocated to the new call, and the contents of the table TBL are updated (step 305). If the frequency allocated to the new call differs from the awaiting frequency, the terminal 15 is notified of the new awaiting frequency. In a system which permits allocation of a communication channel of a frequency differing from the control channel frequency, when a frequency differing from that of the control channel frequency is allocated for a communication channel, the frequency is directly allocated to the terminal as a communication channel frequency.

(D) Overall Sequence Control

Figure 14:
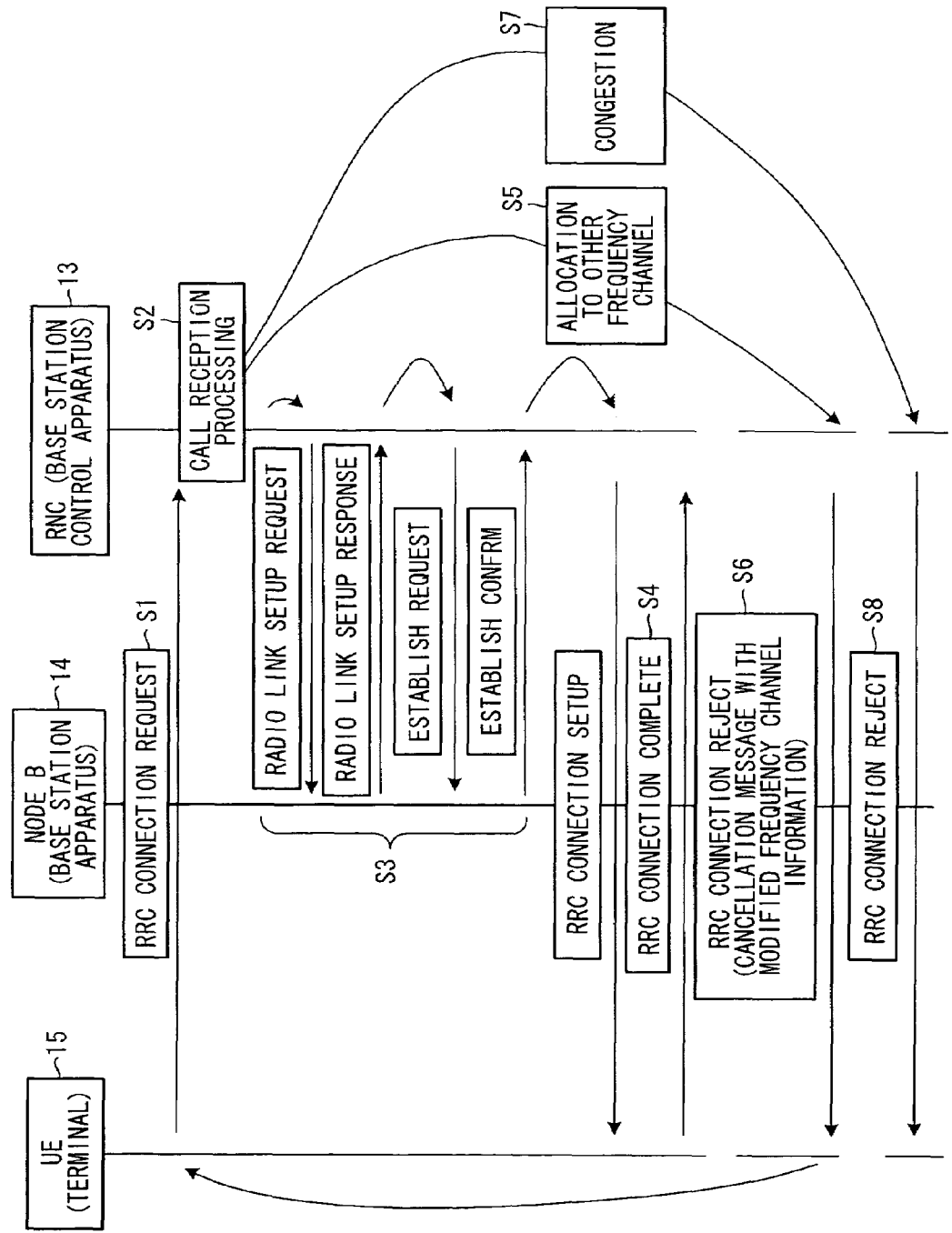
FIG. 14 is a diagram of the first sequence control method for the entire system.

FIG. 14 is a diagram of a first sequence control method for the entire system.

When a specific frequency (the awaiting frequency) RF1, set in advance, is used to input an RRC connection request (S1) from the terminal 15, the base station control apparatus 13 executes one of the first through third frequency allocation processing methods (for example, the first frequency allocation processing method of FIG. 10), explained in FIG. 10 through FIG. 13 (S2). When, through frequency allocation processing, the same frequency as the awaiting frequency is allocated to a call, a setup sequence for the wireless link shown is performed between the base station control apparatus 13 and the base station 14 (S3), to establish an RRC connection (RRC connection setup, RRC connection complete; S4), and subsequent communications are initiated.

If on the other hand a frequency other than the awaiting frequency is allocated to the call in frequency allocation processing (S5), the base station control apparatus 13 transmits a cancellation message with modified frequency information to the terminal 15 (S6). That is, the base station control apparatus 13 uses this message to reject the RRC connection (RRC connection reject), and notifies the terminal 15 of the new awaiting frequency. If the terminal 15 has a function for calling again automatically, then an RRC connection request can again be issued, using the new frequency of the notification, without terminal operation by the user. The base station control apparatus 13 allocates a channel of the same frequency as this new frequency for communication. The awaiting frequency of the terminal is subsequently changed to the frequency of the notification.

If in frequency allocation processing no frequency can be allocated to a call, a state of congestion exists (S7), and so the base station control apparatus 13 issues an RRC connection rejection to the terminal 15.

The first sequence control method is effective when the terminal has a function for calling again automatically.

Figure 15:
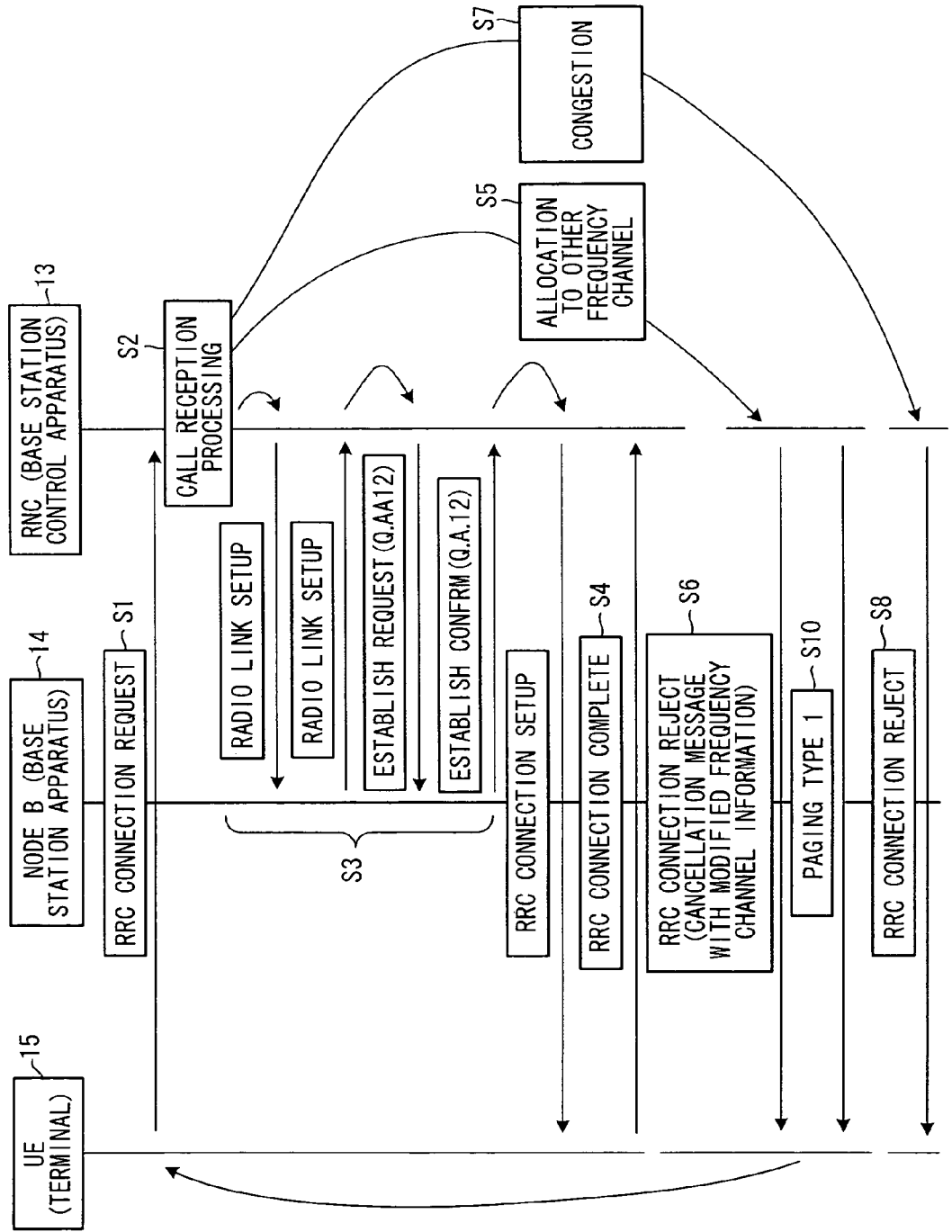
FIG. 15 is a diagram of the second sequence control method for the entire system.

FIG. 15 is a diagram of the second sequence control method for the entire system; portions which are the same as in the first sequence control method are assigned the same sequence numbers. A difference is, in S10, the paging of the base station control apparatus 13. This second sequence control method is effective when the terminal does not have a function for calling again automatically.

When, in frequency allocation processing, a frequency other than the awaiting frequency is allocated to the call (S5), the base station control apparatus 13 transmits a cancellation message with modified frequency information to the terminal 15 (S6). That is, the base station control apparatus 13 uses this message to reject the RRC connection (RRC connection reject), and notifies the terminal 15 of the new awaiting frequency. On this occasion the base station control apparatus 13 uses paging (paging type 1) to page the terminal 15 (S10), and the terminal 15 issues an RRC connection request again, at the same frequency as the received awaiting frequency.

Figure 16:
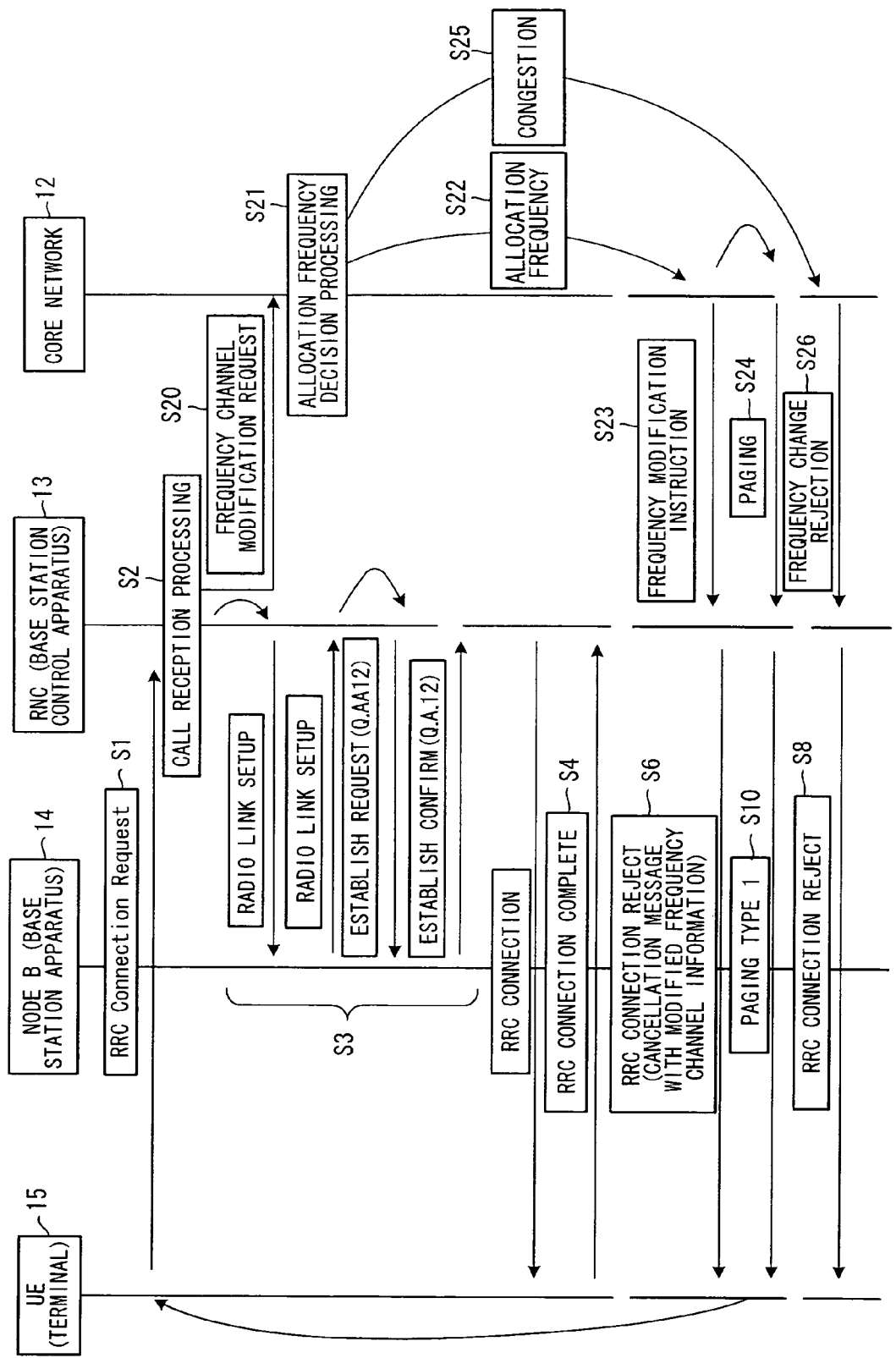
FIG. 16 is a diagram of the third sequence control method for the entire system.

FIG. 16 is a diagram of the third sequence control method for the entire system; portions which are the same as in the second sequence control method are assigned the same sequence numbers. Differences are the inability to allocate the awaiting frequency to the call, and a request by the base station control apparatus 13 to the core network 12 for frequency allocation.

Upon input from the terminal 15 of an RRC connection request (S1), the base station control apparatus 13 executes, for example, the first frequency allocation processing (FIG. 10) (S2). Through this frequency allocation processing, when the same frequency as the awaiting frequency is to be allocated to the call, an RRC connection is established similarly to the first sequence control method (RRC connection setup, RRC connection complete; S4), and subsequent communication is initiated.

On the other hand, when in frequency allocation processing the same frequency as the awaiting frequency cannot be allocated, the base station control apparatus 13 issues a request for modification of the awaiting frequency to the core network 12 (S20). By this request, the core network 10 performs processing similar to that of step 104 and later in FIG. 10 (S21), determines a frequency (a new awaiting frequency) for allocation to the new call (S22), and notifies the base station control apparatus 13 of the frequency (S23). As a result, the base station control apparatus 13 transmits a cancellation message with modified frequency information to the terminal 15 (S6). That is, the base station control apparatus 13 uses this message to reject the RRC connection (RRC connection reject), and notifies the terminal 15 of the new awaiting frequency.

Then, the core network 12 issues a paging request to the base station control apparatus 13 (S24). As a result the base station control apparatus 13 uses paging (paging type 1) to page the terminal 15 (S10), and the terminal 15 issues once again an RRC connection request at the same frequency as the received awaiting frequency.

If the core network 12 cannot allocate any frequency to the call in frequency allocation processing, a state of congestion exists (S25), and so the core network sends to the base station control apparatus 13 a frequency change rejection (S26). As a result, the base station control apparatus 13 issues an RRC connection rejection to the terminal 15. If the terminal 15 is capable of re-origination, the paging after S6 is not necessary.

Figure 17:
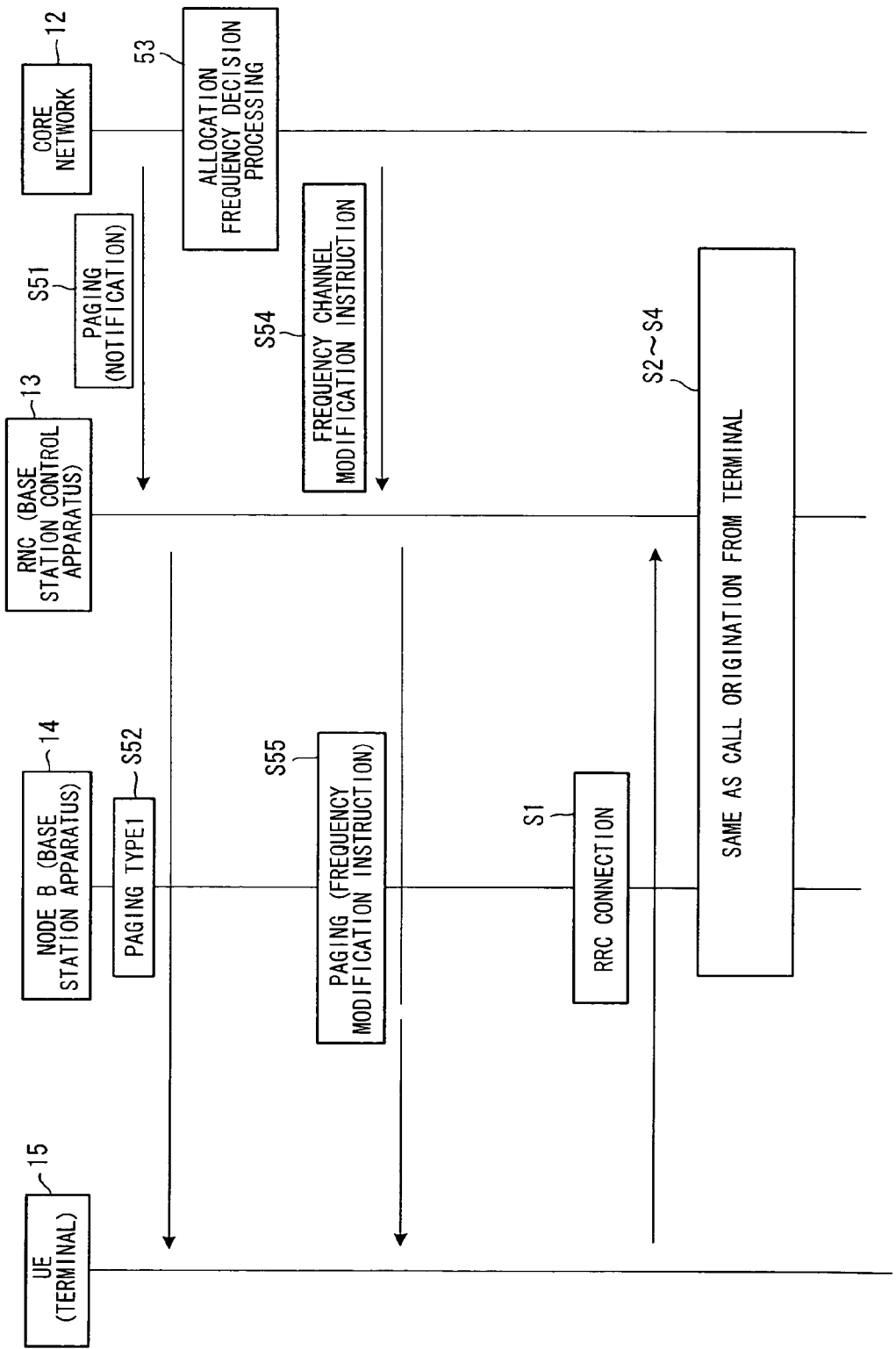
FIG. 17 is a sequence example for a case in which, on the occasion of a terminating call, the core network performs frequency allocation processing.

FIG. 17 is a sequence example for a case in which, on the occasion of a terminating call, the core network performs frequency allocation processing. Upon arrival of a terminating call, the core network 12 notifies the base station control apparatus 13 of the signal by paging (S51), and the base station control apparatus 13 also uses paging (paging type 2) to notify the terminal 15 of the signal (S52). Then the core network 12 executes one of the first through third frequency allocation processing methods (for example, the first frequency allocation processing of FIG. 10), explained in FIG. 10 through FIG. 13 (S53). If through frequency allocation processing the awaiting frequency changes, the core network 12 sends a frequency change instruction to the base station control apparatus 13 (S54). As a result, the base station control apparatus 13 uses paging to notify the terminal 15 of the change in awaiting frequency (S55).

Thereafter, an RCC connection request is issued from a terminal comprising a re-origination function, the sequence steps S1 through S4 of FIG. 14 are executed, a connection is established with the other party, and communication becomes possible.

Figure 18:
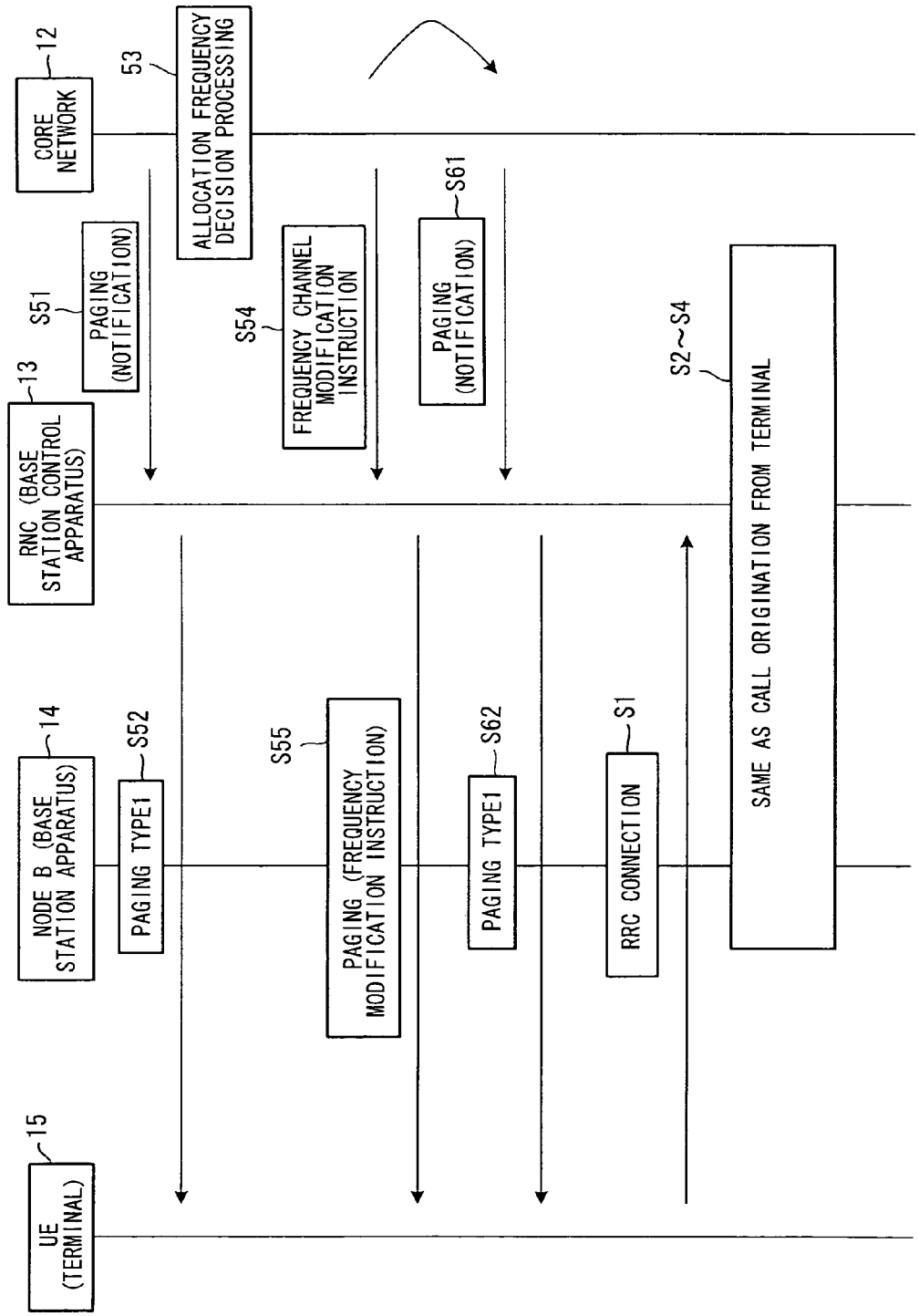
FIG. 18 is another sequence example for a case in which, on the occasion of a terminating call, the core network performs frequency allocation processing.
Figure 19:
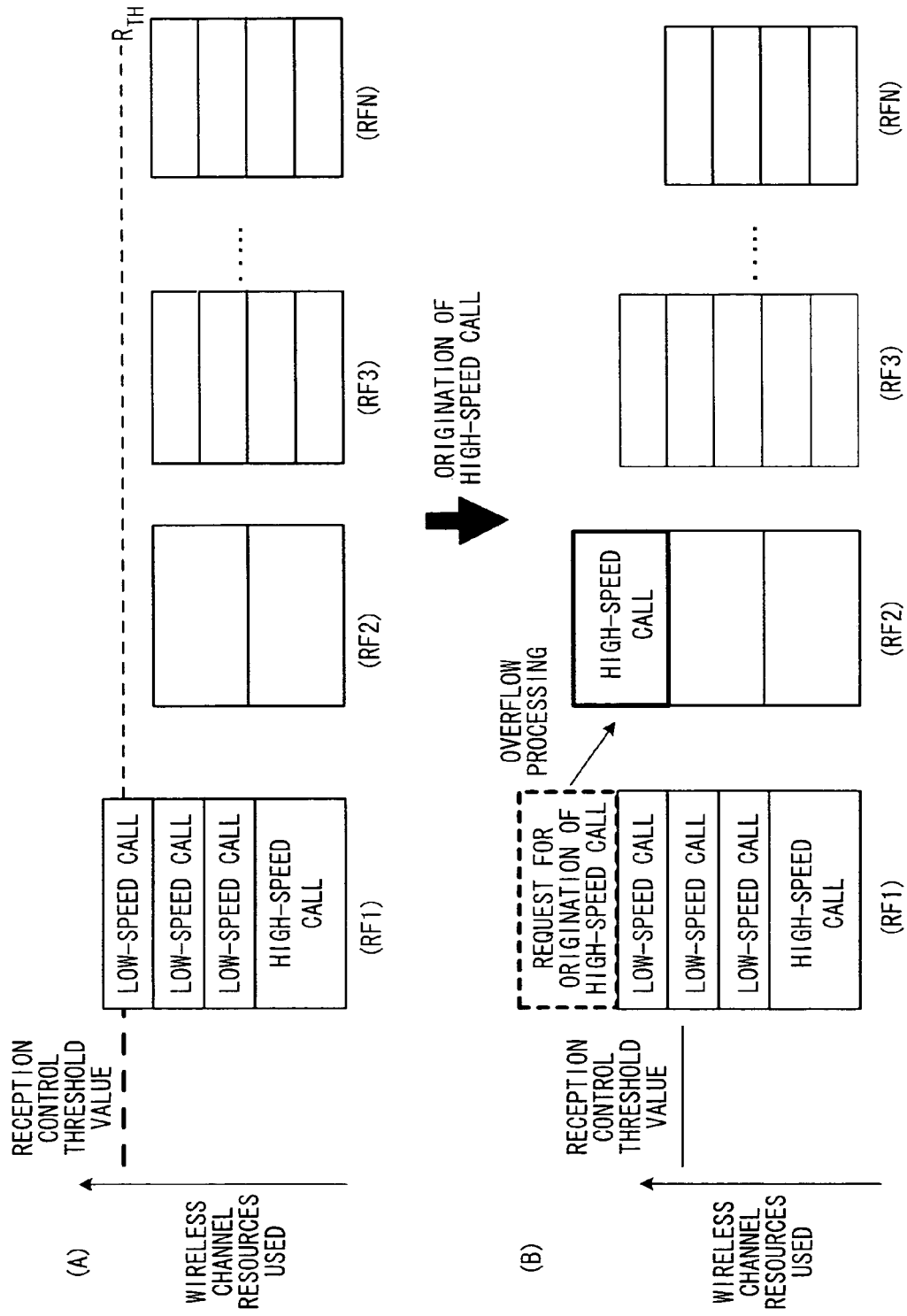
FIG. 19 explains a reception control type traffic control method of the prior art; and, FIG. 20 explains the increase in total base station transmission power in a multiple-connection traffic model.
Figure 20:
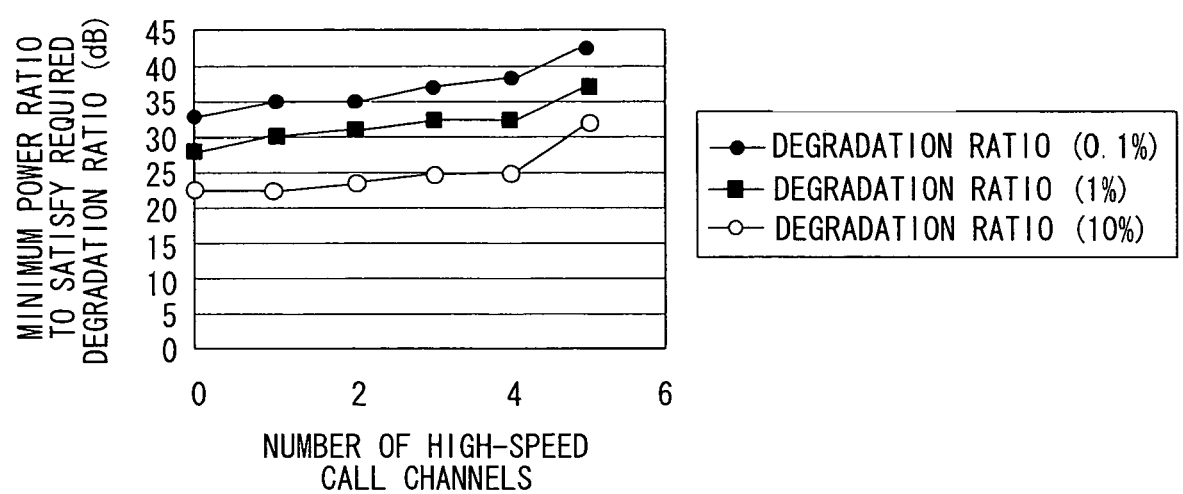

FIG. 18 is an example for a case in which the terminal does not have a re-origination function; differences with FIG. 17 are the use by the core network 12 of paging to notify the base station control apparatus 13 of the arriving signal after an instruction to change the awaiting frequency (S61), and use of paging (paging type 2) by the base station control apparatus 13 also to notify the terminal 15 of the arriving signal (S62). In a system which permits allocation of a communication channel at a frequency differing from the control channel frequency, the frequency allocation of this invention may also be realized by directly allocating to the terminal a communication channel of a frequency differing from the frequency of the control channel at the time of call origination, without changing the awaiting frequency.

Through the above invention, the following advantageous results are obtained, and the possibility of industrial use is considerable.

1) As an advantageous result of suppressing fluctuations in communication channel quality, this invention enables the accommodation of more subscribes within a limited frequency band.

2) Under conditions of accommodating the same number of subscribers, a system can be proposed with a reduced number of base stations and entailing lower costs.

3) The invention can be realized solely through modifications in the firmware on the side of RNCs and other components of the base station control apparatus.

4) An object of this invention is achieved through reduction of unevenness in the number of calls in the system among different frequencies; this is also beneficial for the object of reducing the number of installed channel cards for each frequency (the operating ratio of channel cards can be increased).

5) There are also cases in which the frequency of low-speed call overflow processing for each frequency can be reduced.

As many apparently widely different embodiments of the present invention can be made without departing from the spirit and scope thereof, it is to be understood that the invention is not limited to the specific embodiments thereof, except as defined in the appended claims.

What is claimed is:

1. A frequency allocation method, in a code division multiplexing communication system that uses a plurality of frequencies, comprising:

monitoring, for each frequency, remaining resources and number of calls for each call type which are allocated to the frequency;

checking whether a new call is of a low-speed call type or a high-speed call type when the new call generates;

if the new call is of the low-speed call type, finding frequencies that are capable of being allocated to the new low-speed call by taking said remaining resources into consideration, and specifying a frequency for which the number of calls of said low-speed call type is smallest from among said frequencies;

if the new call is of the high-speed call type, finding frequencies that are capable of being allocated to the new high-speed call by taking said remaining resources into consideration, and specifying a frequency for which the number of calls of said high-speed call type is smallest from among said frequencies; and allocating said specified frequency to the new call.

2. A frequency allocation method, in a code division multiplexing communication system that uses a plurality of frequencies, comprising:

monitoring, for each frequency, remaining resources and number of calls for each call type which are allocated to the frequency;

allocating, when a specific frequency predetermined in advance can be allocated to a new call by taking said remaining resource into consideration, the specific frequency to the new call;

checking, when said specific frequency cannot be allocated to the new call, whether the new call is of a low-speed call type or a high-speed call type;

if the new call is of the low-speed call type, finding frequencies that are capable of being allocated to the new low-speed call by talcing said remaining resources into consideration, and specifying a frequency for which the number of calls of said low-speed call type is smallest from among said frequencies;

if the new call is of the high-speed call type, finding frequencies that are capable of being allocated to the new high-speed call by taking said remaining resources into consideration, and specifying a frequency for which the number of calls of said high-speed call type is smallest from among said frequencies; and allocating said specified frequency to the new call.

3. A frequency allocation method, in a code division multiplexing communication system that uses a plurality of frequencies, comprising:

monitoring, for each frequency, remaining resources and number of calls for each call type which are allocated to the frequency;

allocating, when a specific frequency predetermined in advance can be allocated to a new call by taking said remaining resources into consideration, one frequency among all frequencies including said specific frequency to the new call, sach that unevenness in the distribution of calls for each call type among the frequencies does not occur;

checking, when said specific frequency cannot be allocated to the new call, whether the new call is of a low-speed call type or a high-speed call type;

if the new call is of the low-speed call type, finding frequencies that are capable of being allocated to the new low-speed call by taking said remaining resources into consideration, and specifying a frequency for which the number of calls of said low-speed call type is smallest from among said frequencies;

if the new call is of the high-speed call type, finding frequencies that are capable of being allocated to the new high-speed call by taking said remaining resources into consideration, and specifying a frequency for which the number of calls of said high-speed call type is smallest from among said frequencies; and allocating said specified frequency to the new call.

4. A base station control apparatus, in a code division multiplexing communication system that uses a plurality of frequencies, comprising:

means for monitoring, for each frequency, the remaining resources and number of calls for each call type which are allocated to the frequency;

means for checking whether a new call is of a low-speed call type or a high-speed call type when the new call generates;

means, if the new call is of the low-speed call type, for finding frequencies that are capable of being allocated to the new low-speed call by taking said remaining resources into consideration, and specifying a frequency for which the number of calls of said low-speed call type is smallest from among said frequencies;

means, if the new call is of the high-speed call type, for finding frequencies that are capable of being allocated to the new high-speed call by taking said remaining resources into consideration, and specifying a frequency for which the number of calls of said high-speed call type is smallest from among said frequencies; and frequency allocation means for allocating said specified frequency to the new call.

5. A base station control apparatus, in a code division multiplexing communication system that uses a plurality of frequencies, comprising:

means for monitoring, for each frequency, remaining resources and number of calls for each call type which are allocated to the frequency;

frequency allocation means for allocating, when a specific frequency predetermined in advance can be allocated to a new call by taking said remaining resource into consideration, the specific frequency to the new call;

means for checking, when said specific frequency cannot be allocated to the new call, whether the new call is of a low-speed call type or a high-speed call type;

means, if the new call is of the low-speed call type, for finding frequencies that are capable of being allocated to the new low-speed call by taking said remaining resources into consideration, and specifying a frequency for which the number of calls of said low-speed call type is smallest from among said frequencies; and means, if the new call is of the high-speed call type, for finding frequencies that are capable of being allocated to the new high-speed call by taking said remaining resources into consideration and specifying a frequency for which the number of calls of said high-speed call type is smallest from among said frequencies, wherein said frequency allocation means allocates said specified frequency to the new call.

6. A base station control apparatus, in a code division multiplexing communication system that uses a plurality of frequencies, comprising:

means for monitoring, for each freqnency, remaining resources and number of calls for each call type which are allocated to the frequency;

frequency allocation means for allocating, when a specific frequency predetermined in advance can be allocated to a new call by taking said remaining resources into consideration, one frequency among all frequencies including said specific frequency to the new call, such that unevenness in the distribution of calls for each call type among the frequencies does not occur;

means for checking, when said specific frequency cannot be allocated to the new call, whether the new call is of a low-speed call type or a high-speed call type;

means, if the new call is of the low-speed call type, for finding frequencies that are capable of being allocated to the new low-speed call by taking said remaining resources into consideration and specifying a frequency for which the number of calls of said low-speed call type is smallest from among said frequencies; and means, if the new call is of the high-speed call type, for finding frequencies that are capable of being allocated to the new high-speed call by taking said remaining resources into consideration, and specifying a frequency for which the number of calls of a said high-speed call type is smallest from among said frequencies, wherein said frequency allocation means allocates said specified frequency to the new call.

* * * * *